United States Patent
Sundström et al.

(10) Patent No.: US 8,509,725 B2
(45) Date of Patent: Aug. 13, 2013

(54) SIGNAL PROCESSING DEVICE AND METHOD

(75) Inventors: Lars Sundström, Lund (SE); Bengt Lindoff, Bjarred (SE); Sven Mattisson, Bjarred (SE); Filip Oredsson, Malmo (SE); Tony Petersson, Malmo (SE); Imad ud Din, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 194 days.

(21) Appl. No.: 13/001,758

(22) PCT Filed: Jun. 15, 2009

(86) PCT No.: PCT/EP2009/057358
§ 371 (c)(1),
(2), (4) Date: Feb. 8, 2011

(87) PCT Pub. No.: WO2010/000603
PCT Pub. Date: Jan. 7, 2010

(65) Prior Publication Data
US 2011/0136455 A1    Jun. 9, 2011

Related U.S. Application Data

(60) Provisional application No. 61/079,903, filed on Jul. 11, 2008, provisional application No. 61/095,430, filed on Sep. 9, 2008.

(30) Foreign Application Priority Data

Jul. 4, 2008 (EP) ..................................... 08159678

(51) Int. Cl.
*H04B 1/26* (2006.01)
(52) U.S. Cl.
USPC .......... 455/323; 455/234.1; 455/334; 375/345
(58) Field of Classification Search
USPC .................. 455/230, 234.1, 234.2, 313–316, 455/323, 334, 339–341; 375/345
See application file for complete search history.

(56) References Cited

U.S. PATENT DOCUMENTS 7,253,761 B1    8/2007    Hoyos et al.
2005/0239432 A1    10/2005    Wilcox
(Continued)

FOREIGN PATENT DOCUMENTS

| CN | 1663137 A | 8/2005 |
| CN | 1905639 A | 1/2007 |
| JP | 2007036862 A | 2/2007 |

OTHER PUBLICATIONS

Harris, F. J. et al. "Digital Receivers and Transmitters Using Polyphase Filter Banks for Wireless Communications." IEEE Transactions on Microwave Theory and Techniques, vol. 51, No. 4, Apr. 2003.

*Primary Examiner* — Nhan Le
(74) *Attorney, Agent, or Firm* — Coats & Bennett, P.L.L.C.

(57) ABSTRACT

A processing device (40) for processing an analog complex input signal generated by downconversion of an aggregated-spectrum radio-frequency signal in a radio-receiver (10), wherein the complex input signal comprises a plurality of sub bands (S1-S4) scattered across a total frequency band (4) of the complex input signal. The processing device (40) comprises a plurality of processing paths ($P_1$-$P_N$). wherein each processing path ($P_1$-$P_N$) is adapted to process an associated sub band (S1-S4). Each processing path comprises a complex mixer ($CM_1$-$CM_N$) adapted to frequency translate the complex input signal, and an analog channel-selection filter ($CSF_1$-$CSF_N$) arranged to filter an output signal of the complex mixer ($CM_1$-$CM_N$) and pass the frequency translated associated sub band (S1-S4). A control unit (60) is adapted to receive control data indicating frequency locations of the sub bands (S1-S4) and, for each processing path ($P_1$-$P_N$). control the local oscillator signal of the complex mixer ($CM_1$-$CM_N$) of the processing path ($P_1$-$P_N$) based on the frequency location of the associated sub band (S1-S4) and the passband of the channel-selection filter ($CSF_1$-$CSF_N$) of the processing path ($P_1$-$P_N$), such that the frequency-translated associated sub band (S1-S4) appears within a passband of the channel-selection filter ($CSF_1$-$CSF_N$) of the processing path ($P_1$-$P_N$). The distortion monitored in the unused paths may be used to improve the performance of the used paths.

25 Claims, 9 Drawing Sheets

(56) References Cited

U.S. PATENT DOCUMENTS

| | | |
|---|---|---|
| 2005/0259724 A1 | 11/2005 | Bergstrom et al. |
| 2006/0281432 A1* | 12/2006 | Isaac et al. .................... 455/323 |
| 2007/0057838 A1* | 3/2007 | Shono ............................. 342/70 |
| 2009/0153085 A1* | 6/2009 | Gonder ..................... 318/400.17 |

* cited by examiner

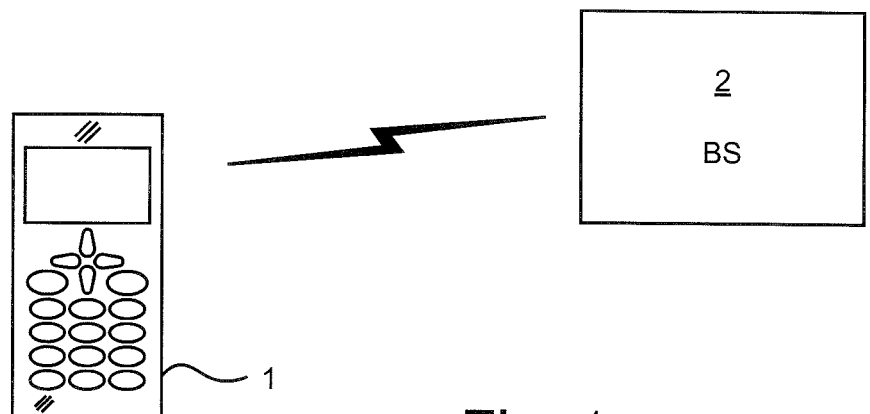
Fig. 1
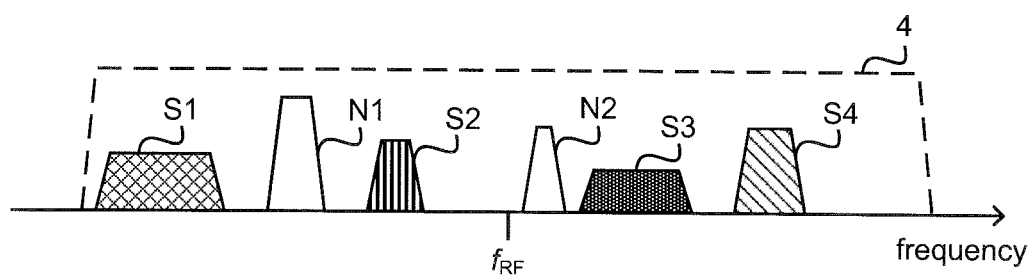
Fig. 2
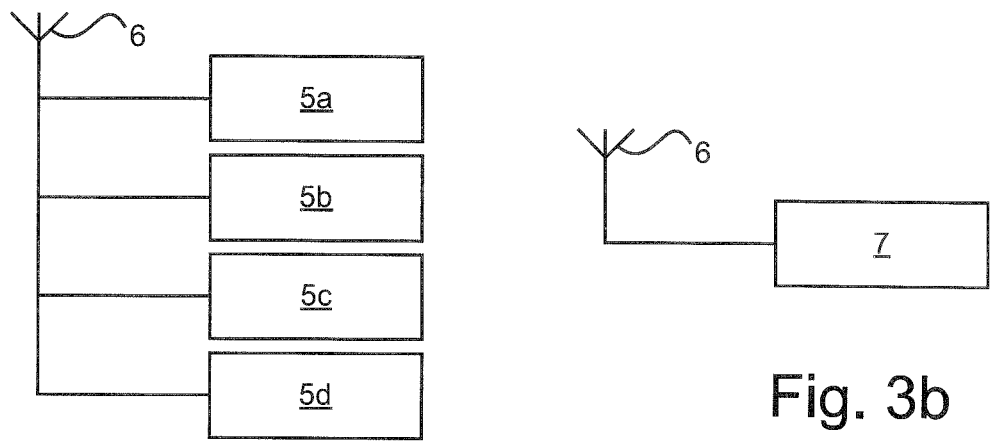
Fig. 3a
Fig. 3b

SIGNAL PROCESSING DEVICE AND
METHOD

TECHNICAL FIELD

The present invention relates to a processing device and method for processing an analog complex input signal. More particularly, the present invention relates to a processing device and method for processing an analog complex input signal generated by downconversion of an aggregated-spectrum radio-frequency signal

BACKGROUND

In order to facilitate wireless communication at increasing data rates, various new standards and systems for mobile communication are emerging. Specifications for fourth generation (4G) mobile communication systems are being drawn up under IMT (International Mobile Telecommunication) Advanced. Future communication systems to be compliant with IMT Advanced require relatively wide RF (Radio Frequency) frequency bands, e.g. to accommodate relatively high bit rates. A problem that has been identified for communication systems compliant with IMT Advanced is that there is normally a lack of sufficiently wide free RF frequency bands; most frequency bands are fragmented, e.g. with different parts of a band being licensed for usage by different operators etc. Continuous frequency bands of e.g. 100 MHz bandwidth or more are normally not available. One way to address this problem is to set up a transmission link between a base station and mobile terminal using several sub bands that are scattered across a total frequency bandwidth to form an aggregated spectrum. An apparatus for receiving and processing RF signals such that multiple simultaneous access to different signal frequencies within an overall signal is provided, either within a common service band or spread over different service bands that are separated in frequency, is e.g. disclosed in U.S. Pat. No. 5,287,837.

The total frequency bandwidth of said aggregated spectrum may be considerably larger than the sum of the bandwidths of the sub bands combined. Normally, it will not be possible to determine the location of the sub bands in advance, e.g. due to that the location of available frequency bands may vary in time and/or with geographical location.

In order to facilitate reception of such aggregated spectrum signals, relatively hard requirements, e.g. in terms of bandwidth and/or dynamic range, may be set on radio-receiver circuitry components. This, in turn, results in relatively high power consumption in the radio-receiver components. However, in a mobile radio terminal, such as a mobile telephone, it is desirable to have relatively low power consumption, since the energy resources are normally limited by the capacity of a battery. In order to e.g. avoid excessively rapid draining of batteries in mobile radio terminals, there is a need for reducing the power consumption in radio-receiver circuits.

SUMMARY

Accordingly, an object of the present invention is to facilitate a reduction of power consumption in radio-receiver circuitry.

According to a first aspect, a processing device for processing an analog complex input signal generated by downconversion of an aggregated-spectrum radio-frequency signal in a radio-receiver is provided. The complex input signal comprises a plurality of sub bands scattered across a total frequency band of the complex input signal. The processing device comprises a plurality of processing paths, wherein each processing path is adapted to process an associated sub band. Each processing path comprises a complex mixer adapted to frequency translate the complex input signal, and thereby the associated sub band, based on a local oscillator signal associated with the complex mixer. Furthermore, each processing path comprises an analog channel-selection filter, operatively connected to an output port of the complex mixer, arranged to filter an output signal of the complex mixer and pass the frequency translated associated sub band. Furthermore, the processing device comprises an oscillator unit arranged to provide the local oscillator signal associated with the complex mixer of each processing path. Moreover, the processing device comprises a control unit adapted to receive control data indicating frequency locations of the sub bands and, for each processing path, control the local oscillator signal of the complex mixer of the processing path based on the frequency location of the associated sub band and the passband of the channel-selection filter of the processing path, such that the frequency-translated associated sub band appears within a passband of the channel-selection filter of the processing path.

The processing device may comprise an additional channel-selection filter arranged to receive the complex input signal of the processing device for filtering the complex input signal of the processing device. The additional channel-selection filter may e.g. comprise a first low-pass filter for passing an in-phase (I) component of a sub band essentially centered around 0 Hz in the complex input signal of the processing device, and a second low-pass filter for passing a quadrature (Q) component of the sub band essentially centered around 0 Hz in the complex input signal of the processing device.

The complex input signal may be a complex baseband signal essentially centered around 0 Hz.

The channel-selection filter in each processing path may comprise a first low-pass filter for filtering an I component of the output signal of the complex mixer of the processing path and a second low-pass filter for filtering a Q component of the output signal of the complex mixer of the processing path. The complex mixer in a first processing path of the plurality of processing paths and the complex mixer in a second processing path of the plurality of processing paths may be arranged to be driven by local-oscillator signals having a common frequency $f_a$ for processing a sub band in the complex input signal essentially centered around $f_a$ and a sub band in the complex input signal essentially centered around $-f_a$, respectively. Furthermore, each processing path may comprise a first analog-to-digital converter (ADC) operatively connected to an output terminal of the first low-pass filter of the processing path for converting the filtered I component to a digital representation and a second ADC operatively connected to an output terminal of the second low-pass filter of the processing path for converting the filtered Q component to a digital representation.

Alternatively, the passbands of the channel-selection filters may be mutually essentially nonoverlapping and the processing device may comprise an adder circuit for adding output signals of the channel-selection filters for forming a compound complex signal. For example, the channel-selection filter of one of the processing paths may comprise a first low-pass filter for filtering an I component of the output signal of the complex mixer of said one of the processing paths and a second low-pass filter for filtering a Q component of the output signal of the complex mixer of said one of the processing paths, whereas the channel-selection filters of the other processing paths may be complex bandpass filters. Alternatively, the channel-selection filter of each processing path may be a complex bandpass filter. The processing device may be adapted to process the complex input signal such that the frequency span in the compound complex signal between the lowest and the highest frequency of the frequency translated sub bands is narrower than the corresponding frequency span in the complex input signal between the lowest and the highest frequency of the sub bands. The processing device may be adapted to process the complex input signal such that the compound complex signal comprises an essentially continuous frequency band comprising all of the frequency-translated sub bands. The processing device may comprise analog-to-digital converters for converting an I and a Q component of the compound complex signal to digital representations.

The control unit may be adapted to control the passbands of the channel-selection filters in response to the received control data.

At least one of the processing paths, referred to as a monitoring path, may be adapted to, if the monitoring path is not currently configured to process a frequency sub band currently allocated to the radio receiver circuit, be configured in a monitoring mode to process one or more frequency sub bands not currently allocated to the radio receiver circuit for estimating distortion.

The control unit may be adapted to configure at least one setting of at least one of the processing paths based on the output of the monitoring path when the monitoring path is configured in the monitoring mode. The control unit may e.g. be adapted to determine, based on distortion estimated from the output of the monitoring path in the monitoring mode, a performance requirement of the at least one processing path and configure said at least one setting of the at least one processing path based on the determined performance requirement.

The at least one setting may include:
a filter order, steepness, and/or Q-value of the analog channel-selection filter of the at least one processing path;
a bias current of the at least one processing path;
a supply voltage of the at least one processing path;
a clock frequency, resolution, and/or noise transfer function of an ADC of the at least one processing path;
phase noise of the local oscillator signal provided to the complex mixer of the at least one processing path; and/or
gain, linearity, noise and/or bandwidth of a component of the at least one processing path.

According to a second aspect, a radio-receiver circuit comprises the processing device according to the first aspect.

According to a third aspect, an electronic apparatus comprises the processing device according to the first aspect. The electronic apparatus may e.g. be, but is not limited to, a portable radio communication equipment, a mobile radio terminal, a mobile telephone, a communicator, an electronic organizer, a smartphone, or a computer.

According to a fourth aspect, a method of processing an analog complex input signal generated by downconversion of an aggregated-spectrum radio-frequency signal in a radio-receiver is provided. The complex input signal comprises a plurality of sub bands scattered across a total frequency band of the complex input signal. The method comprises receiving control data indicating frequency locations of the sub bands. Furthermore, the method comprises, for each sub band, processing the sub band in an associated processing path of a plurality of processing paths by providing a local oscillator signal associated with a complex mixer of the associated processing path; frequency translating the complex input signal, and thereby the sub band, in the complex mixer of the associated processing path based on the local oscillator signal associated with the complex mixer; filtering an output signal of the complex mixer in an analog channel-selection filter of the associated processing path; and controlling the local oscillator signal of the complex mixer of the associated processing path based on the frequency location of the sub band and the passband of the channel-selection filter of the associated processing path, such that the frequency-translated sub band appears within a passband of the channel-selection filter of the associated processing path.

Further embodiments of the invention are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which:

FIG. 1 schematically illustrates a mobile telephone arranged in communication with a base station;

FIG. 2 schematically illustrates an aggregated signal spectrum according to an example;

FIGS. 3a and b illustrate receiver architectures used as reference examples;

DETAILED DESCRIPTION

Figure 4:
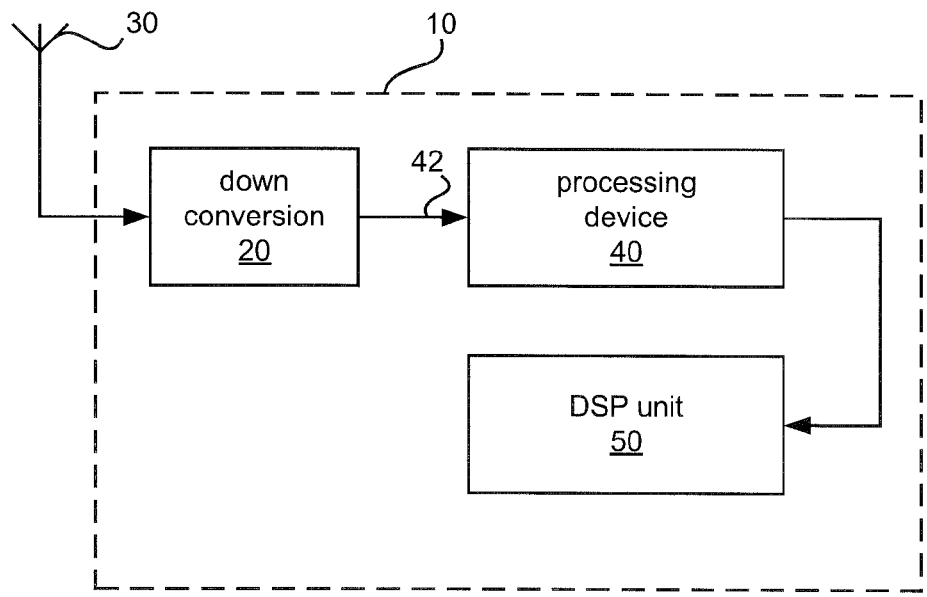
FIG. 4 is a block diagram of a radio receiver according to an embodiment of the present invention.

FIG. 1 illustrates an environment where embodiments of the present invention may be employed. An electronic apparatus 1 with radio communication capabilities is adapted to communicate with a base station (BS) 2 via radio signals. In FIG. 1, the electronic apparatus 1 is illustrated as a mobile telephone. However, this is only an example and not intended to limit the scope of the present invention. For example, the electronic apparatus 1 may be, but is not limited to, a portable radio communication equipment, a mobile radio terminal, a communicator, i.e. an electronic organizer, a smartphone, or the like, or a personal computer (PC), e.g. a laptop.

The electronic apparatus 1 may e.g. be adapted for radio communication in a communication system compliant with IMT (International Mobile Telecommunication) Advanced. Furthermore, the electronic apparatus may also be adapted for radio communication in one or more other types of communication systems, such as but not limited to 3G LTE (Long Term Evolution) communication systems, GSM (Global System for Mobile communication) communication systems, and/or UMTS (Universal Mobile Telecommunications System) communication systems Furthermore, a single BS 2 is used as illustration in FIG. 1. However, this is only an example. The electronic apparatus 1 may be arranged to be operatively connected to a plurality of BSs, operating within the same type or different types of communication systems. For example, the electronic apparatus 1 may be operatively connected to a plurality of BSs in order to facilitate so called soft handover (SHO) between BSs.

In this specification, an electronic apparatus, such as the electronic apparatus 1, which is adapted to communicate with a BS, such as the BS 2, via radio signals is referred to as a mobile terminal (MT).

FIG. 2 illustrates an aggregated signal spectrum of a radio-frequency (RF) signal according to an example, which will be used in this specification to illustrate various embodiments of the present invention. Such an aggregated signal spectrum may e.g. be expected to appear in communication systems compliant with IMT Advanced. A total frequency band of the RF signal is designated with reference number 4. The RF signal is centered around an RF frequency $f_{RF}$. Within the total frequency band 4, there are sub bands S1-S4, which are allocated to a communication link between a BS and an MT. In the following, the sub bands S1-S4 are referred to as sub bands allocated to the MT. Note, however, that one or more of the sub bands S1-S4 may be used for communication of data between the BS and more than one MT, e.g. for broadcasting or multicasting of data from the BS to the MTs, or using time-division multiple access (TDMA), code-division multiple access (CDMA), or frequency-division multiple access (FDMA) within the sub band S1-S4. However, from the MT's perspective, the frequency bands S1-S4 are allocated for transmission of data from the BS to the MT, regardless of whether or not the BS utilizes one or more of the frequency bands to communicate with other MTs as well. As indicated in FIG. 2, the frequency bands S1-S4 may have different bandwidths and signal strengths.

Furthermore, one or more blocking signals N1, N2 may appear within the total frequency band 4. The blocking signals N1, N2 may e.g. emanate from one or more other communication systems and/or from other equipment operating within the same communication system.

The total frequency band 4 may have a significantly wider bandwidth than the total bandwidth of the sub bands S1-S4. Hence, relatively hard bandwidth requirements may be set on receiver-circuit components of the MT. Furthermore, due to the presence of blocking signals, which may have relatively high signal strengths, relatively hard dynamic range requirements may be set on receiver-circuit components of the MT.

The signal spectrum illustrated in FIG. 2 is merely an example used for illustration. For example, four sub bands S1-S4 are allocated to an MT in FIG. 2. However, other numbers of sub bands than four may be allocated to an MT. Furthermore, the number, frequency locations, and/or bandwidths of sub bands allocated to an MT may vary e.g. in time and/or with geographic location.

The different sub bands S1-S4 allocated to the MT need not necessarily be transmitted from the same BSs, or be based on the same communication standard for that matter. For example, the MT may be simultaneously connected to several BSs that e.g. may belong to different types of communication systems, such as UMTS systems, 3G LTE systems, and/or various systems compliant with IMT Advanced. One or more of the sub bands S1-S4 may be allocated for communication between a certain one of the BSs and the MT.

FIGS. 3a and b illustrate radio receiver architectures for receiving aggregated spectrum RF signals, which are used in this specification as reference examples for comparison with embodiments of the present invention. In the architecture illustrated in FIG. 3a, several radio receivers 5a-d receive the aggregated spectrum RF signal via an antenna 6. However, each radio receiver 5a-d utilizes its own local oscillator (LO) delivering an RF LO signal tuned to one of the sub bands S1-S4. Hence, each radio receiver 5a-d is used for downconverting one of the sub bands S1-S4 from an RF band and process the downconverted sub band. With this solution, the bandwidth requirement on each receiver 5a-d may be on par with the bandwidth of the corresponding sub band S1-S4, i.e. may be significantly lower than the bandwidth of the total frequency band 4. Furthermore, the blocking signals N1-N2 may be relatively easily removed by filtering. However, the use of several separate radio receivers 5a-d results in relatively high power consumption, which is a disadvantage. Furthermore, coexistence of several radio receivers 5a-d, each having its own RF LO signal frequency, within the same MT may result in interference problems between the radio receivers 5a-d. Moreover, the circuit area required for several radio receivers 5a-d may be relatively large.

In the architecture illustrated in FIG. 3b, a single radio receiver 7 is arranged to receive, downconvert, and process the whole total frequency band 4. Although this architecture e.g. avoids the interference problems with multiple RF LO signals described with reference to FIG. 3a, and requires less circuit area than the solution with several radio receivers 5a-d, relatively hard bandwidth requirements are set on this solution due to the relatively large bandwidth of the total frequency band 4, and relatively hard dynamic range requirements are set on this solution to cope with blocking signals N1-N2. This, in turn, normally results in a relatively large power consumption.

FIG. 4 shows a block diagram of a radio receiver 10 according to an embodiment of the present invention. The radio receiver 10 may e.g. be comprised in an MT. As illustrated in FIG. 4, the radio receiver 10 comprises a downconversion unit 20 adapted to be operatively connected to an antenna 30 for receiving RF signals. In FIG. 4, the antenna 30 is illustrated as being external to the radio-receiver 10. However, in other embodiments, the antenna 30 is comprised in the radio receiver 10. Furthermore, although a single antenna 30 is shown in FIG. 4, multiple antennas may be used, e.g. arranged in a multiple-input multiple-output (MIMO) or similar arrangement.

The downconversion unit 20 is adapted to downconvert a received aggregated spectrum RF signal to a lower frequency band, such as a baseband or an intermediate-frequency (IF) band, to facilitate further processing and demodulation of the received signal. The downconversion unit 20 may e.g. comprise one or more low-noise amplifiers (LNAs), filters, mixers, and/or local oscillators etc. for performing the downconversion according to methods well known in the art. The output signal from the downconversion unit is a downconverted version of the whole aggregated spectrum RF signal (i.e. a single downconversion unit is used for downconverting all sub bands S1-S4 allocated to the radio receiver). For example, with reference to the example illustrated in FIG. 2, the output signal from the downconversion unit is a downconverted version of the whole total frequency band 4. Hence, a single downconversion unit 20 is used for downconverting all sub bands S1-S4 allocated to the radio receiver 10 (i.e. the sub bands allocated to the MT in which the radio receiver is comprised).

The downconversion unit 20 is arranged to operate in quadrature for generating a pair of signals; an in-phase (I) component and a quadrature (Q) component. The I and Q components together represents a complex signal output from the downconversion unit 20. By means of using a complex signal representation with an I and a Q component, it is possible to distinguish between signal contents at positive and negative frequencies. Downconversion in quadrature may e.g. be obtained by means of mixing with a first and a second RF LO signal having the same frequency and a mutual phase difference of 90°, as is well known in the art. In the embodiments and examples presented in the following of this detailed description, the downconversion unit 20 is adapted to downconvert the received RF signal to a baseband, whereby the downconverted version of the total frequency band 4 in the complex output signal from the downconversion unit 20 includes 0 Hz, or DC. For example, in the complex output signal from the downconversion unit 20, the downconverted version of the total frequency band 4 may be centered or essentially centered around 0 Hz. However, this is only an example. According to some embodiments, the downconversion unit 20 is adapted to downconvert the received RF signal to an IF band that does not cover 0 Hz.

The radio receiver 10 further comprises a processing device 40 for processing an analog complex input signal. In FIG. 4, the processing device 40 is arranged to receive the complex output signal of the downconversion unit 20 on an input port 42 of the processing device 40 as the analog complex input signal. A single line is used in FIG. 4 to represent the connection between the downconversion unit 20 and the processing device 40. However, this is only for illustrative purposes; the processing device 40 is arranged to receive both the I and the Q component of the output from the downconversion unit 20. Moreover, in FIG. 4, the connection between the downconversion unit 20 and the processing device 40 is illustrated as a direct connection. However, in other embodiments, one or more intervening elements, such as but not limited to one or more buffer amplifiers, filters, and/or variable gain amplifiers (VGAs) may be present in the path between the downconversion unit 20 and the processing device 40.

According to embodiments of the invention, the processing device 40 is adapted to process the complex input signal of the processing device based on control data indicating frequency locations of the sub bands S1-S4 allocated to the radio receiver 10 such that bandwidth requirements and/or dynamic range requirements of radio-receiver components are relaxed, whereby a reduced power dissipation is facilitated. Examples of such processing is given below in the context of specific embodiments. The control data indicating the frequency locations of the sub bands S1-S4 allocated to the radio receiver 10 may e.g. be sent to the radio receiver 10 over a dedicated logical control channel or pilot channel.

Furthermore, according to the embodiment illustrated in FIG. 4, the radio receiver 10 comprises a digital signal processing (DSP) unit 50 for further processing of output signals from the processing device 40, e.g. for demodulation and/or recovery of received data. As will be illustrated in the context of specific embodiments, the processing device 40 may comprise one or more analog-to-digital converters (ADCs) for converting analog signals to a digital representation suitable for processing in the DSP unit 50. Alternatively, one or more ADCs (not shown) may be inserted in the path between the processing device 40 and the DSP unit 50. Further alternatively, the DSP unit 50 may comprise an analog interface (not shown) comprising one or more ADCs. The DSP unit 50 may e.g. comprise, be, or be comprised in a digital baseband circuit (DBB, not shown).

Figure 5:
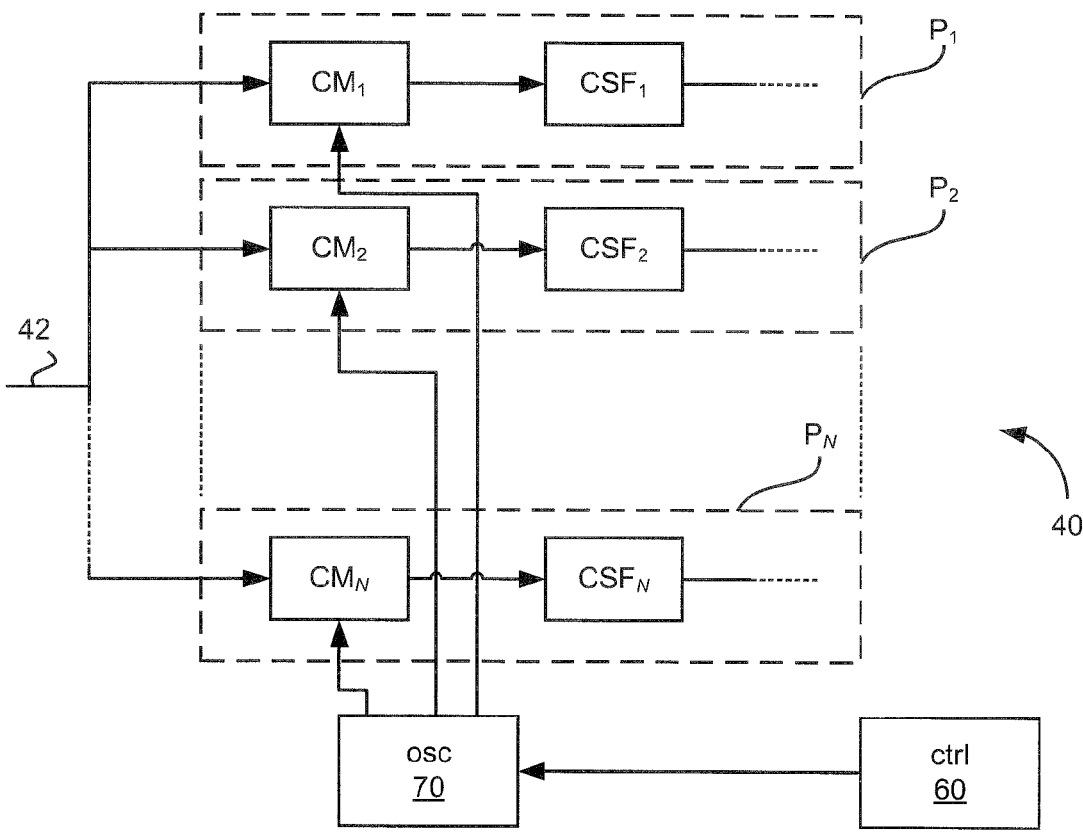
FIG. 5 is a block diagram of a processing device according to an embodiment of the present invention.

FIG. 5 is a block diagram of an embodiment of the processing device 40. According to the embodiment, the processing device 40 comprises a plurality of processing paths $P_1$-$P_N$. Each processing path $P_1$-$P_N$ comprises a complex mixer (CM) $CM_1$-$CM_N$ and an analog channel-selection filter (CSF) $CSF_1$-$CSF_N$. For simplicity, single lines are used in FIG. 5 to represent connections to input and output ports of the CMs $CM_1$-$CM_N$ and the CSFs $CSF_1$-$CSF_N$, although the signals transferred over these connections are complex signals, having an I and a Q component. Furthermore, although the connections between each CM $CM_1$-$CM_N$ and the following CSF $CSF_1$-$CSF_N$ are illustrated as direct connections in FIG. 5, one or more intervening elements, such as but not limited to one or more buffer amplifiers, filters, and/or VGAs may be present in the path between each CM $CM_1$-$CM_N$ and the following CSF $CSF_1$-$CSF_N$.

Each processing path $P_1$-$P_N$ is adapted to process a single sub band S1-S4 currently allocated to the radio receiver 10. The sub band S1-S4 currently being processed in a particular processing path $P_1$-$P_N$ is referred to in the following as the sub band associated with the particular processing path. Similarly, the processing path $P_1$-$P_N$ currently being used for processing a particular sub band S1-S4 is referred to in the following as the processing path associated with the particular sub band.

Each CM $CM_1$-$CM_N$ is adapted to frequency translate the complex input signal of the processing device 40 based on a local oscillator (LO) signal associated with the CM $CM_1$-$CM_N$. Furthermore, each CSF $CSF_1$-$CSF_N$ is arranged to filter an output signal of the preceding CM $CM_1$-$CM_N$. The output signals from the CSFs $CSF_1$-$CSF_N$ may be output signals of the processing device 40, e.g. in embodiments where ADCs are inserted in the path between the processing device 40 and the DSP unit 50 (FIG. 4) or the ADCs are comprised in an analog interface of the DSP unit 50. Alternatively, as indicated by the dotted lines in FIG. 5, the processing device may comprise additional elements (not shown in FIG. 5) for further processing of the output signals from the CSFs $CSF_1$-$CSF_N$.

Furthermore, according to the embodiment illustrated in FIG. 5, the processing device 40 comprises a control unit 60 adapted to receive control data. Moreover, the control unit 60 is adapted to determine, based on the control data, frequency locations of the sub bands S1-S4 allocated to the radio receiver 10.

In addition, the embodiment of the processing device 40 illustrated in FIG. 5 comprises an oscillator unit 70. The oscillator unit 70 is arranged to provide the LO signal associated with the CM $CM_1$-$CM_N$ of each processing path $P_1$-$P_N$. Each CM $CM_1$-$CM_N$ requires an I and a Q LO signal, having a mutual phase difference of 90°, for its operation. Hence, the LO signal provided to each CM $CM_1$-$CM_N$ is a complex LO signal having an I and a Q component. For simplicity, single lines are used in FIG. 5 to represent the connections between the oscillator unit 70 and the CMs $CM_1$-$CM_N$.

Furthermore, the control unit 60 is operatively connected to the oscillator unit 70 for controlling the generation of the LO signals to the CMs $CM_1$-$CM_N$. For example, the control unit 60 may be adapted to control the frequency and/or mutual phase relationship between the I and Q component of each LO signal.

By controlling the generation of the LO signals from the control unit 60, the complex input signal to the processing device 40 can be processed in the processing paths $P_1$-$P_N$ such that the content of each sub band S1-S4 allocated to the radio receiver 10 appears in an output signal of the CSF $CSF_1$-$CSF_N$ of the processing path $P_1$-$P_N$ associated with the sub band S1-S4, whereas some or all signal content outside the sub band (e.g. the blocking signals N1-N2 and/or some or all of the other of the sub bands S1-S4) can be suppressed in the CSFs $CSF_1$-$CSF_N$.

In the reference example illustrated in FIG. 3a, each sub band S1-S4 is individually downconverted from an RF band in a separate radio receiver 5a-d. In contrast thereto, the embodiment illustrated in FIG. 5 facilitates the use of a single downconversion (e.g. by the downconversion unit 20, FIG. 4) from an RF band for all sub bands together. Hence, only a single (complex) RF LO signal is needed, in contrast to several RF LO signals with different frequencies that are needed in the reference example illustrated in FIG. 3a. Thereby, the embodiment illustrated in FIG. 5 facilitates a reduction of interference from LO-signals compared with the reference example illustrated in FIG. 3a; even though several LO signals with different frequencies are generated by the oscillator unit 70, these are not RF LO signals, but LO signals having lower frequencies, which are less prone to interfere with other circuitry than RF LO signals are. Furthermore, since the LO signals generated by the oscillator unit have lower frequencies than the RF LO signals, simpler circuitry (such as but not limited to a direct digital synthesis (DDS) unit), which e.g. consume less power than circuitry for generating RF LO signals, may be used for generating the LO signals in the oscillator unit 70. Hence, the embodiment illustrated in FIG. 5 also facilitates a reduced power consumption compared with the reference example illustrated in FIG. 3a.

Compared with the reference example illustrated in FIG. 3b, the embodiment illustrated in FIG. 5 facilitates a relaxation of overall bandwidth requirements of radio receiver circuit components, since the processing device 40 alleviates the need to process the whole total frequency band 4, and instead allows focusing on the sub bands S1-S4 actually allocated to the radio receiver 10. Furthermore, since the blocking signals N1-N2 can be filtered out in the CSFs $CSF_1$-$CSF_N$, dynamic range requirements on radio-receiver circuit components can be relaxed. Relaxation of bandwidth and/or dynamic range requirements, in turn, facilitates a reduction in power consumption compared with the reference example illustrated in FIG. 3b.

Figure 6:
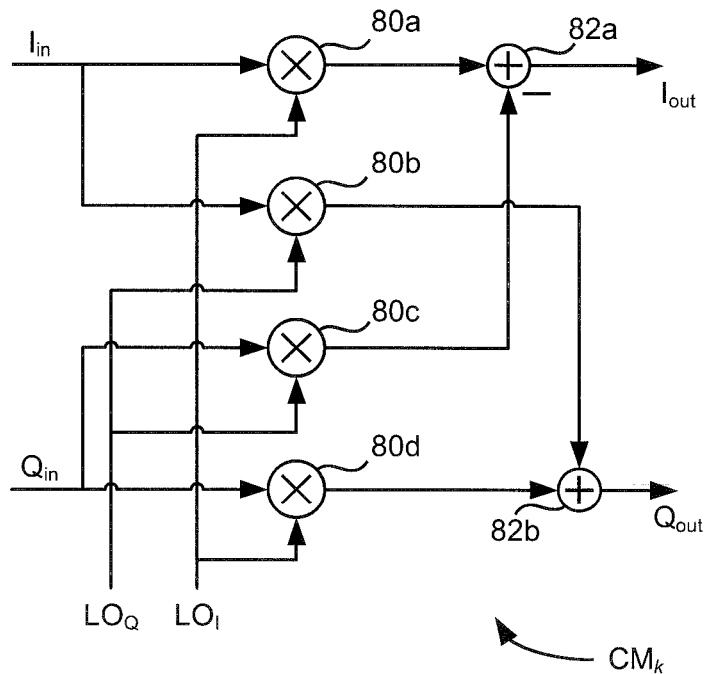
FIG. 6 is a block diagram of a complex mixer according to an embodiment of the present invention.

FIG. 6 is a block diagram of a CM $CM_k$ according to an embodiment of the present invention. Each of the CMs $CM_1$-$CM_N$ (FIG. 5) of the processing device 40 may be implemented as the CM $CM_k$ in FIG. 6. The I and Q components of the input signal enter the CM $CM_k$ at labels $I_{in}$ and $Q_{in}$, respectively. Similarly, the I and Q components of the output signal are output from the CM $CM_k$ at labels $I_{out}$ and $Q_{out}$, respectively. The CM $CM_k$ comprises four mixer elements 80a-d and two adder elements 82a-b. The I component of the input signal is fed to the mixer elements 80a and b, and the Q component of the input signal is fed to the mixer elements 80c and d. The mixer elements 80a and d are driven by an I component, $LO_I$, of an LO signal, and the mixer elements 80b and c are driven by a Q component, $LO_Q$, of the LO signal. The adder element 82a generates the I component of the output signal by subtracting the output signal of the mixer element 80c from the output signal of the mixer element 80a, and the adder element 82b generates the Q component of the output signal by adding the output signal of the mixer element 80b to the output signal of the mixer element 80d.

Let $f_{LO}$ denote the frequency of the LO signal. If the phase of $LO_Q$ is 90° ahead of the phase of $LO_I$, the resulting frequency translation is negative, i.e. the translation is such that the signal content at $+f_{LO}$ in the input signal is translated to 0 Hz. On the other hand, if the phase of $LO_I$ is 90° ahead of the phase of $LO_Q$, the resulting frequency translation is positive, i.e. the translation is such that the signal content at $-f_{LO}$ in the input signal is translated to 0 Hz. Hence, the control unit 60 (FIG. 5) can control whether the CM $CM_k$ should perform a positive or negative frequency translation by controlling the sign of the mutual phase difference between $LO_I$ and $LO_Q$. For example, swapping between a positive and negative frequency translation (or vice versa) can be obtained by changing the sign of either $LO_I$ or $LO_Q$. Alternatively, a swap between a positive and a negative frequency translation (or vice versa) can be obtained by swapping $LO_I$ and $LO_Q$.

Figure 7:
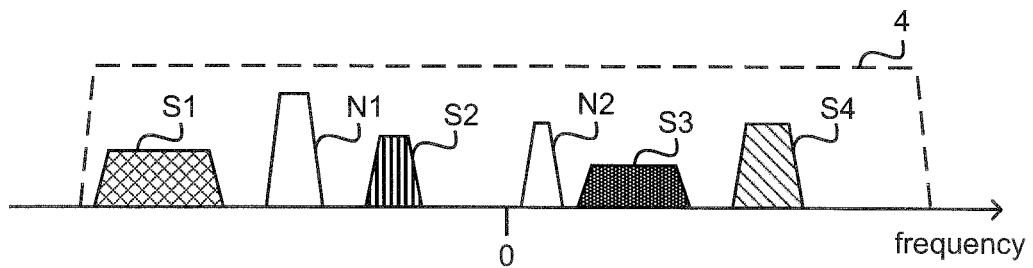
FIG. 7 schematically illustrates a downconverted aggregated signal spectrum according to an example.

FIG. 7 illustrates the spectrum of a downconverted version of the aggregated spectrum RF signal shown in FIG. 2 output from the downconversion unit 20. The same reference signs are used for the (downconverted) sub bands S1-S4, blocking signals N1-N2, and the total frequency band 4 as for the corresponding RF frequency bands in FIG. 2. In the example, the downconverted total frequency band 4 is centered around 0 Hz. Hence, the received RF signal is, in this example, downconverted to a baseband. For example, the received RF signal may be downconverted in the downconversion unit 20 by means of homodyne mixing with an RF LO signal having a frequency of $f_{RF}$. However, as described above, in some embodiments, the received RF signal may be downconverted to a frequency band that is not centered around 0 Hz. In the following, the signal, whose spectrum is illustrated in FIG. 7, is used as the complex analog input signal to the processing device 40 for illustration of various embodiments of the processing device 40.

Figure 8:
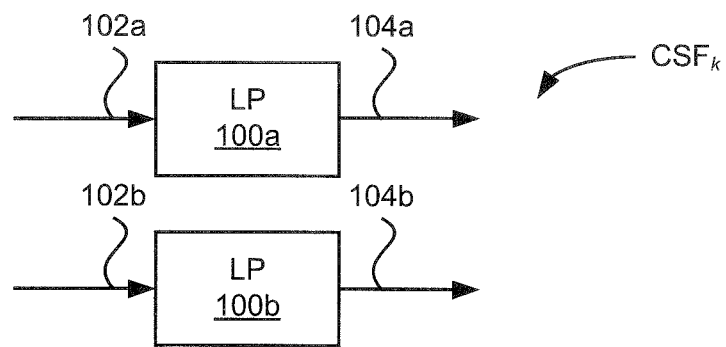
FIG. 8 is a block diagram of a channel-selection filter according to an embodiment of the present invention.

FIG. 8 is a block diagram of an embodiment of a CSF $CSF_k$ according to an embodiment. According to this embodiment, the CSF $CSF_k$ comprises a first and a second lowpass (LP) filter 100a and b. The LP filter 100a is arranged to receive the I component of the output signal of the preceding CM $CM_k$ on an input terminal 102a and output the I component of the output signal of the CSF $CSF_k$ on an output terminal 104a. Similarly, the LP filter 100b is arranged to receive the Q component of the output signal of the preceding CM $CM_k$ on an input terminal 102b and output the Q component of the output signal of the CSF $CSF_k$ on an output terminal 104b.

According to an embodiment, the CSF $CSF_1$-$CSF_N$ in each processing path $P_1$-$P_N$ is implemented as the CSF $CSF_k$ in FIG. 8. That is, the CSF $CSF_1$-$CSF_N$ in each processing path $P_1$-$P_N$ comprises a first LP filter 100a for filtering the I component of the output signal of the CM $CM_1$-$CM_N$ of the processing path $P_1$-$P_N$ and a second LP filter 100b for filtering the Q component of the output signal of the CM $CM_1$-$CM_N$ of the processing path $P_1$-$P_N$. Operation of this embodiment is illustrated in FIGS. 9a-d. FIGS. 9a-d illustrate output signals from CMs and CSFs in the frequency domain according to an example, in which the complex input signal illustrated in FIG.

7 is input to the processing device 40. In the example, four processing paths, $P_1$-$P_4$, are utilized for processing the complex input signal. In the event that the processing device 40 comprises more than four processing paths $P_1$-$P_N$, the other processing paths (i.e. $P_5$-$P_N$) may be disabled or powered off. The same reference signs S1-S4 are used for the (frequency translated) sub bands S1-S4 allocated to the radio receiver 10 in FIGS. 9a-d as for the corresponding sub bands in FIGS. 2 and 7. For readability, only the sub bands S1-S4 allocated to the radio receiver 10 are provided with reference signs in FIGS. 9a-d, whereas the reference signs for the blocking signals N1-N2 are omitted in FIGS. 9a-d.

Figure 9A:
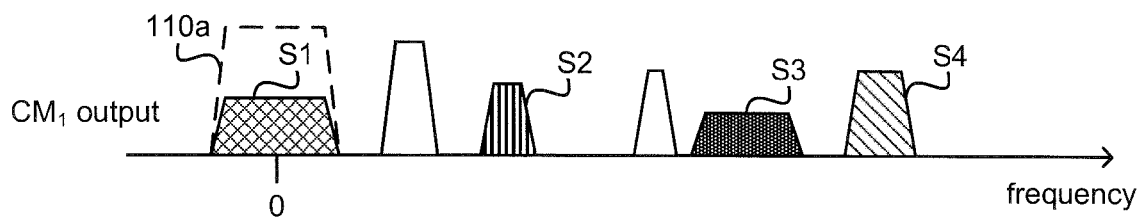
FIGS. 9a-d illustrate output signals from complex mixers and channel-selection filters in the frequency domain according to an example.

FIG. 9a illustrates the output signals from the CM $CM_1$ and the CSF $CSF_1$. FIG. 9a also includes a schematic illustration of the passband 110a of the CSF $CSF_1$. The control unit 60 (FIG. 5) controls the LO signal associated with the CM $CM_1$ such that the sub band S1, in the output signal from the CM $CM_1$, is centered around 0 Hz and appears within the passband 110a of the CSF $CSF_1$. In the output signal from the CSF $CSF_1$, only the sub band S1 is present, whereas the other sub bands S2-S4 and the blocking signals N1-N2 are removed (or at least significantly attenuated) by the CSF $CSF_1$. Since the sub band S1 appears at a negative frequency in the complex input signal (see FIG. 7), the control unit 60 should control the LO signal associated with the CM $CM_1$ such that the phase of the I component of the LO signal is 90° ahead of the phase of the Q component.

Figure 9B:
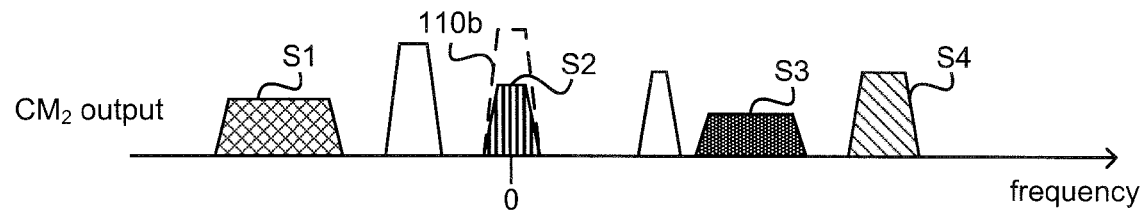

FIG. 9b illustrates the output signals from the CM $CM_2$ and the CSF $CSF_2$. FIG. 9b also includes a schematic illustration of the passband 110b of the CSF $CSF_2$. The control unit 60 (FIG. 5) controls the LO signal associated with the CM $CM_2$ such that the sub band S2, in the output signal from the CM $CM_2$, is centered around 0 Hz and appears within the passband 110b of the CSF $CSF_2$. In the output signal from the CSF $CSF_2$, only the sub band S2 is present, whereas the other sub bands S1 and S3-S4, and the blocking signals N1-N2 are removed (or at least significantly attenuated) by the CSF $CSF_2$. Since the sub band S2 appears at a negative frequency in the complex input signal (see FIG. 7), the control unit 60 should control the LO signal associated with the CM $CM_2$ such that the phase of the I component of the LO signal is 90° ahead of the phase of the Q component.

Figure 9C:
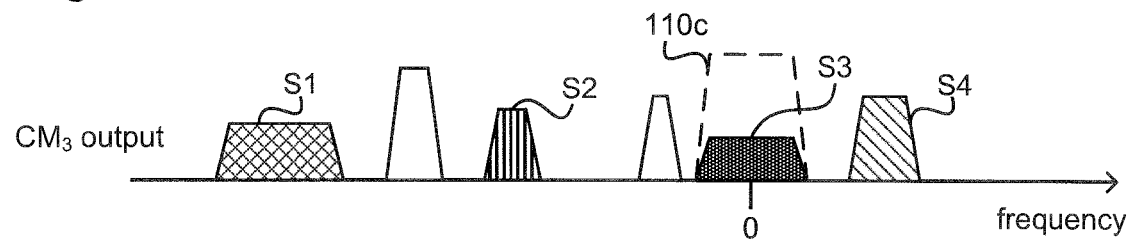

FIG. 9c illustrates the output signals from the CM $CM_3$ and the CSF $CSF_3$. FIG. 9c also includes a schematic illustration of the passband 110c of the CSF $CSF_3$. The control unit 60 (FIG. 5) controls the LO signal associated with the CM $CM_3$ such that the sub band S3, in the output signal from the CM $CM_3$, is centered around 0 Hz and appears within the passband 110c of the CSF $CSF_3$. In the output signal from the CSF $CSF_3$, only the sub band S3 is present, whereas the other sub bands S1-S2 and S4, and the blocking signals N1-N2 are removed (or at least significantly attenuated) by the CSF $CSF_4$. Since the sub band S3 appears at a positive frequency in the complex input signal (see FIG. 7), the control unit 60 should control the LO signal associated with the CM $CM_3$ such that the phase of the Q component of the LO signal is 90° ahead of the phase of the I component.

Figure 9D:
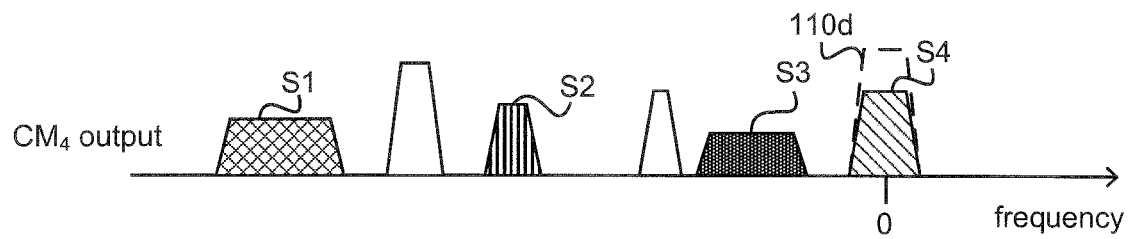

FIG. 9d illustrates the output signals from the CM $CM_4$ and the CSF $CSF_4$. FIG. 9d also includes a schematic illustration of the passband 110d of the CSF $CSF_4$. The control unit 60 (FIG. 5) controls the LO signal associated with the CM $CM_4$ such that the sub band S4, in the output signal from the CM $CM_4$, is centered around 0 Hz and appears within the passband 110d of the CSF $CSF_4$. In the output signal from the CSF $CSF_4$, only the sub band S4 is present, whereas the other sub bands S1-S3, and the blocking signals N1-N2 are removed (or at least significantly attenuated) by the CSF $CSF_4$. Since the sub band S4 appears at a positive frequency in the complex input signal (see FIG. 7), the control unit 60 should control the LO signal associated with the CM $CM_4$ such that the phase of the Q component of the LO signal is 90° ahead of the phase of the I component.

According to some embodiments, the LP filters 100a and b in the CSFs $CSF_1$-$CSF_N$ are fixed filters, i.e. filters with fixed frequency responses. For example, each CSF $CSF_1$-$CSF_N$ may comprise LP filters 100a and b with a fixed bandwidth. The fixed bandwidths may e.g. be designed to correspond to typically used signal bandwidths for a certain communication system.

According to other embodiments, the LP filters 100a and b in some or all of the CSFs $CSF_1$-$CSF_N$ are controllable filters, i.e. filters with controllable frequency responses, which e.g. may be controlled from the control unit 60 (FIG. 5). For example, these filters may have controllable bandwidths. Thereby, the control unit may adapt the bandwidths of the filters to the frequency bands currently in use.

Figure 10:
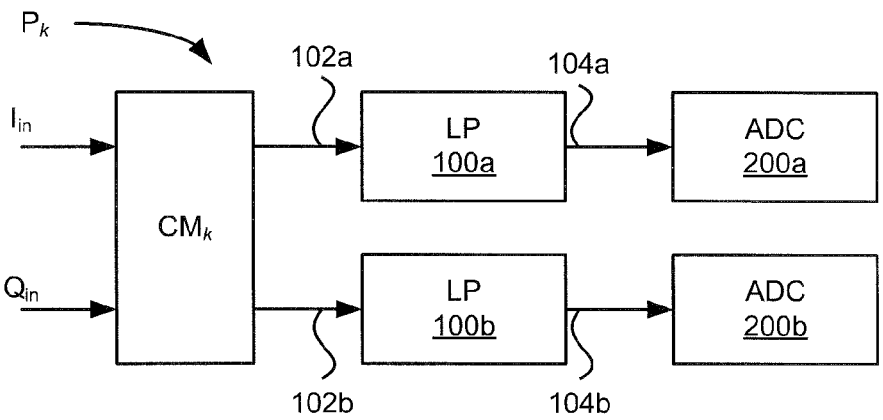
FIG. 10 is a block diagram of a processing path of a processing device according to an embodiment of the present invention.

FIG. 10 is a block diagram of an embodiment of processing path $P_k$, in which the CSF $CSF_k$ comprises a first and a second LP filter 100a and b arranged to filter the I and the Q component, respectively, of the output signal from the CM $CM_k$. According to this embodiment, the processing path $P_k$ comprises a first and a second ADC 200a and b, arranged to convert the filtered I and Q component, respectively, to digital representations. Said digital representations may be output from the processing device 40, e.g. to the DSP unit 50 (FIG. 4). Although the ADCs 200a and b are illustrated in FIG. 10 as being directly connected to the LP filters 100a and b, respectively, one or more intervening elements, such as but not limited to one or more additional filters, buffer amplifiers, and/or VGAs may be included in the paths between the LP filters 100a and b and the following ADCs 200a and b.

According to some embodiments, the processing device 40 is instead arranged to output an analog signal. Then, the ADCs 200a and b may be omitted in the processing path $P_k$. Instead, the ADCs 200a and b may e.g. be inserted in the signal path between the processing device 40 and the DSP unit 50 (FIG. 4), or comprised in an analog interface of the DSP unit 50.

Figure 11:
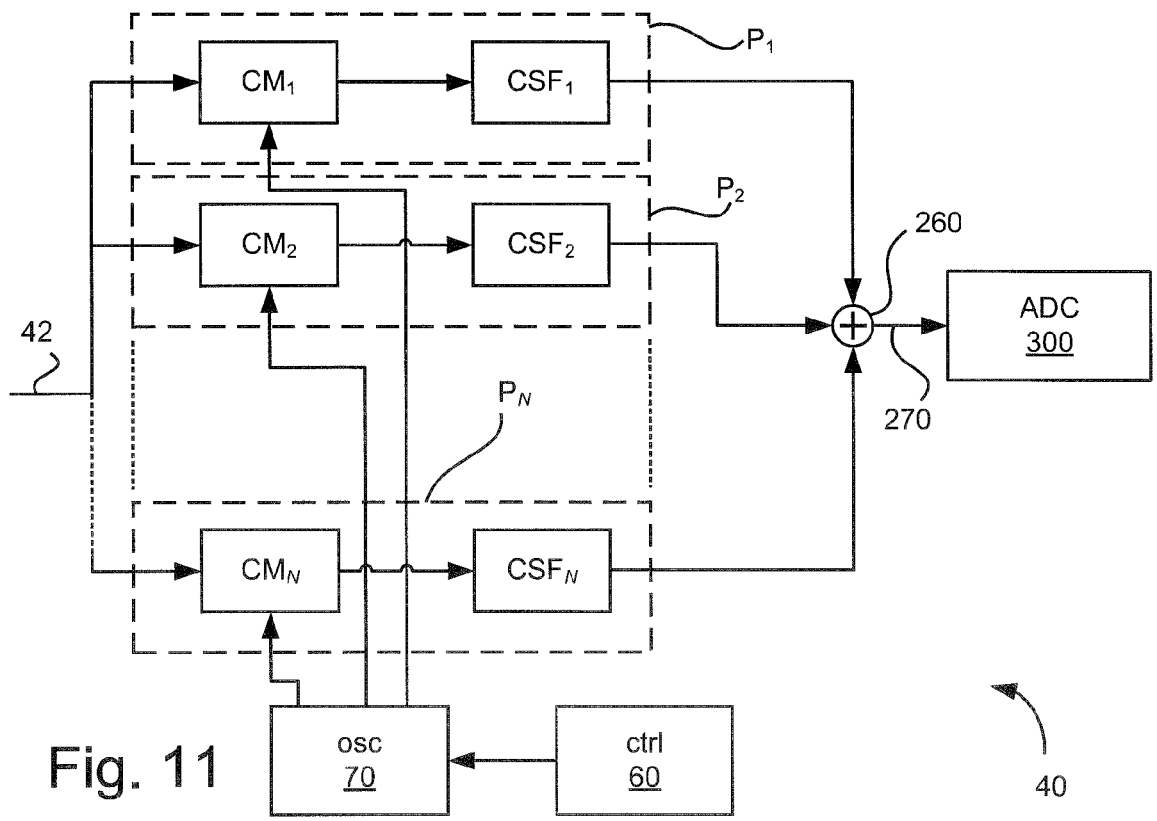
FIG. 11 is a block diagram of a processing device according to an embodiment of the present invention.

FIG. 11 is a block diagram of an embodiment of the processing device 40. According to this embodiment, the processing device 40 comprises an adder circuit 260. The adder circuit 260 is operatively connected to the CSFs $CSF_1$-$CSF_N$ for adding the complex output signals from the CSFs $CSF_1$-$CSF_N$, thereby forming a compound complex signal on an output terminal 270 of the adder circuit 260. In order to avoid interference between the output signals from the different CSFs $CSF_1$-$CSF_N$ in the compound output signal, the passbands of the CSFs $CSF_1$-$CSF_N$ are nonoverlapping, or essentially nonoverlapping. A small amount of overlap may be acceptable in some cases, e.g. if the passband of a CSF is slightly wider than the bandwidth of the associated sub band, but this may need to be verified from implementation to implementation, e.g. based on measurements and/or computer simulations.

As illustrated in FIG. 11, the processing device 40 may comprise ADCs 300 for converting the compound complex signal to a digital representation. The box 300 in FIG. 11 is illustrated as a single ADC. However, it represents separate ADCs for converting the I and Q components of the compound complex signal to digital representations. Said digital representations may be output from the processing device 40, e.g. to the DSP unit 50 (FIG. 4). As has been described above, the processing device 40 may be arranged to output an analog signal. Then, the ADCs 300 may be omitted in the processing device. Instead, the ADCs 300 may e.g. be inserted in the signal path between the processing device 40 and the DSP unit 50 (FIG. 4), or comprised in an analog interface of the DSP unit 50.

Although the adder circuit 260 is illustrated in FIG. 11 as being directly connected to the CSFs $CSF_1$-$CSF_N$ and the ADCs 300, one or more intervening elements, such as but not limited to one or more filters, buffer amplifiers, and/or VGAs may be included in the paths between the CSFs $CSF_1$-$CSF_N$ and the adder circuit 260 and/or the signal paths between the adder circuit 260 and the ADCs 300.

Figure 12:
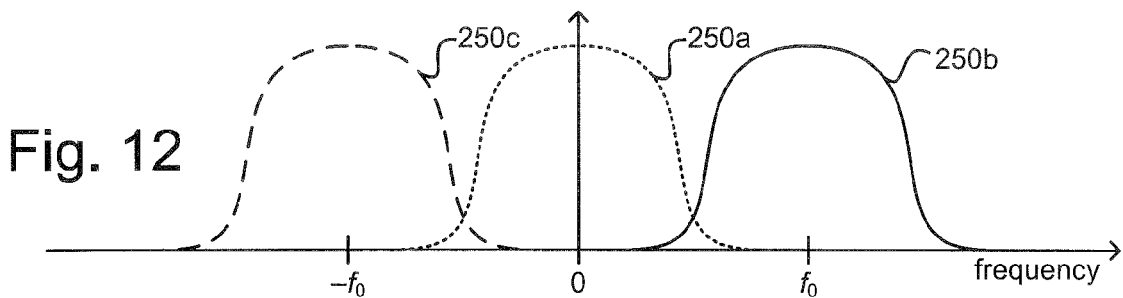
FIG. 12 show magnitude responses of a lowpass reference filter and complex bandpass filters according to an example.

Some or all of the CSFs $CSF_1$-$CSF_N$ in the embodiment illustrated in FIG. 11 may be implemented as complex bandpass (BP) filters. A complex BP filter is a BP filter adapted to receive a complex input signal, having an I and a Q component, and output a complex output signal, also having an I and a Q component. Furthermore, the complex BP filter has a BP characteristic with a passband located either at positive or negative frequencies. That is, the complex BP filter can be considered to be a single side-band bandpass filter, and is capable of distinguishing between signal contents at positive and negative frequencies. A complex BP filter can be synthesized starting from a real-valued LP reference filter. The transfer function of the reference filter is transformed by means of a frequency translation. This is schematically illustrated in FIG. 12. In FIG. 12, the magnitude of the transfer function 250a of an LP reference filter is plotted, together with the magnitude of the transfer functions 250b and c of two complex BP filters generated based on the LP reference filter. In the following, $H(j2\pi f)$ is used for denoting the transfer function 250a of the LP reference filter. The transfer function 250b has the passband center frequency $f_0$. The frequency translation for generating the transfer function 250b from the transfer function 250a is:

$$H(j2\pi f) \rightarrow H(j2\pi (f-f_0))$$

Similarly, the transfer function 250c has the passband center frequency $-f_0$. The frequency translation for generating the transfer function 250c from the transfer function 250a is:

$$H(j2\pi f) \rightarrow H(j2\pi (f+f_0))$$

Complex BP filters are known in the art, e.g. described in the article P. Andreani et al, "A CMOS gm-C Polyphase Filter with High Image Band Rejection", *Proceedings of 26th European Solid-State Circuits Conference (ESSCIRC '00)*, pp. 244-247, September 2000. Therefore, details thereof will not be further described in this specification.

Figure 13A:
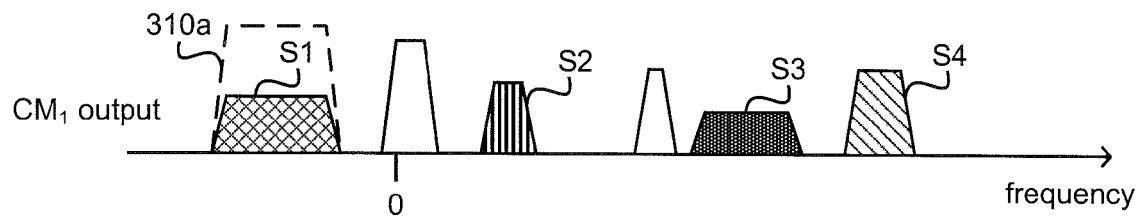
FIGS. 13a-e illustrate output signals from complex mixers and channel-selection filters and a compound signal in the frequency domain according to an example.
Figure 13B:
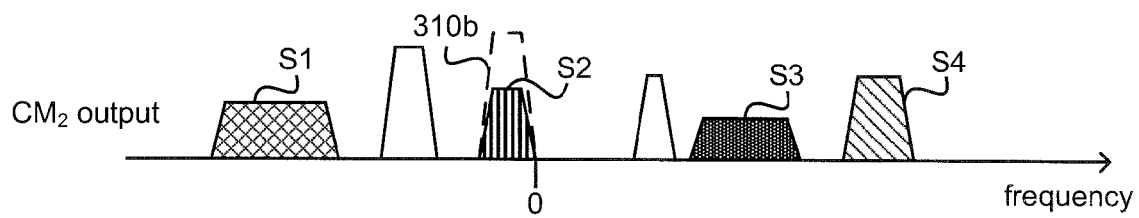
Figure 13C:
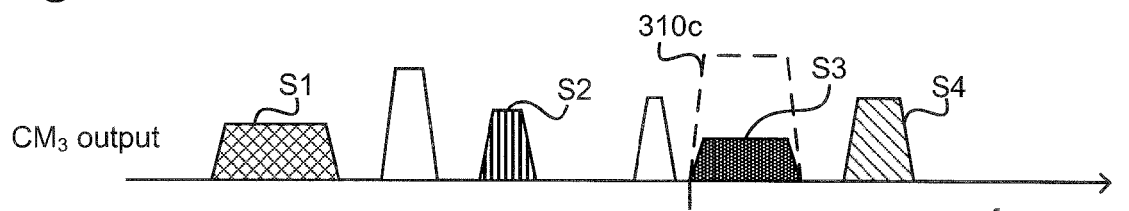
Figure 13D:
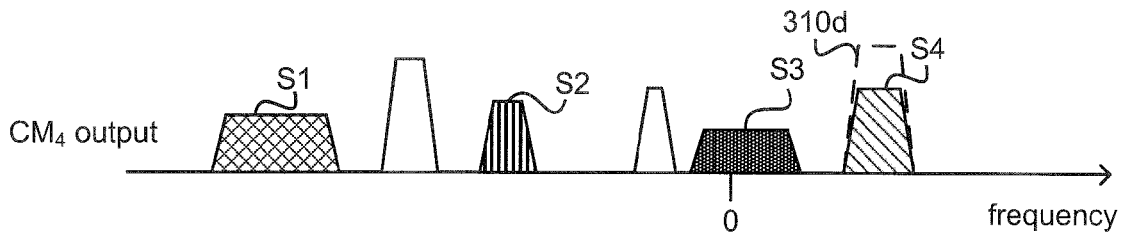
Figure 13E:
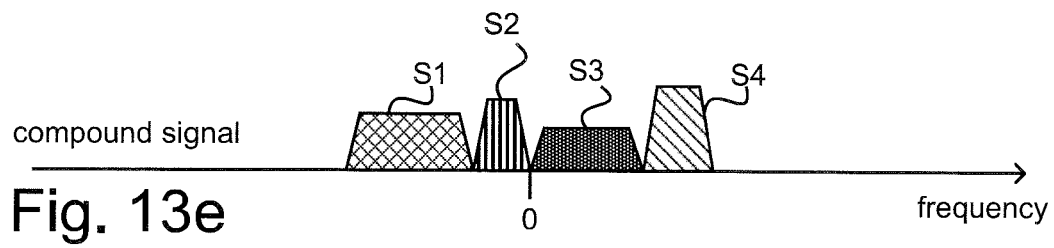

Operation of the embodiment shown in FIG. 11 is illustrated in FIGS. 13a-e. FIGS. 13a-d illustrate output signals from CMs and CSFs in the frequency domain according to an example, in which the complex input signal illustrated in FIG. 7 is input to the processing device 40. FIG. 13e illustrates the compound complex signal output from the adder circuit 260 in the frequency domain. In the example, four processing paths, $P_1$-$P_4$, are utilized for processing the complex input signal. In the event that the processing device 40 comprises more than four processing paths $P_1$-$P_N$, the other processing paths (i.e. $P_5$-$P_N$) may be disabled or powered off. The same reference signs S1-S4 are used for the (frequency translated) sub bands S1-S4 allocated to the radio receiver 10 in FIGS. 13a-d as for the corresponding sub bands in FIGS. 2 and 7. For readability, only the sub bands S1-S4 allocated to the radio receiver 10 are provided with reference signs in FIGS. 13a-d, whereas the reference signs for the blocking signals N1-N2 are omitted in FIGS. 13a-d.

FIG. 13a illustrates the output signals from the CM $CM_1$ and the CSF $CSF_1$. FIG. 13a also includes a schematic illustration of the passband 310a of the CSF $CSF_1$. The control unit 60 controls the LO signal associated with the CM $CM_1$ such that the sub band S1, in the output signal from the CM $CM_1$, appears within the passband 310a of the CSF $CSF_1$. In the output signal from the CSF $CSF_1$, only the sub band S1 is present, whereas the other sub bands S2-S4, and the blocking signals N1-N2 are removed (or at least significantly attenuated) by the CSF $CSF_1$. The passband 310a of the CSF $CSF_1$ appears at negative frequencies, and may thus be implemented as a complex BP filter. The passband 310a has a center frequency that is closer to 0 Hz than the center frequency of the sub band S1 in the complex input signal (see FIG. 7). Hence, the CM $CM_1$ should perform a positive frequency translation, and the control unit 60 should control the LO signal associated with the CM $CM_1$ such that the phase of the I component of the LO signal is 90° ahead of the phase of the Q component.

FIG. 13b illustrates the output signals from the CM $CM_2$ and the CSF $CSF_2$. FIG. 13b also includes a schematic illustration of the passband 310b of the CSF $CSF_2$. The control unit 60 controls the LO signal associated with the CM $CM_2$ such that the sub band S2, in the output signal from the CM $CM_2$, appears within the passband 310b of the CSF $CSF_2$. In the output signal from the CSF $CSF_2$, only the sub band S2 is present, whereas the other sub bands S1 and S3-S4, and the blocking signals N1-N2 are removed (or at least significantly attenuated) by the CSF $CSF_2$. The passband 310b of the CSF $CSF_2$ appears at negative frequencies, and may thus be implemented as a complex BP filter. The passband 310b has a center frequency that is closer to 0 Hz than the center frequency of the sub band S2 in the complex input signal (see FIG. 7). Hence, the CM $CM_2$ should perform a positive frequency translation, and the control unit 60 should control the LO signal associated with the CM $CM_1$ such that the phase of the I component of the LO signal is 90° ahead of the phase of the Q component.

FIG. 13c illustrates the output signals from the CM $CM_3$ and the CSF $CSF_3$. FIG. 13c also includes a schematic illustration of the passband 310c of the CSF $CSF_3$. The control unit 60 controls the LO signal associated with the CM $CM_3$ such that the sub band S3, in the output signal from the CM $CM_3$, appears within the passband 310c of the CSF $CSF_3$. In the output signal from the CSF $CSF_3$, only the sub band S3 is present, whereas the other sub bands S1-S2 and S4, and the blocking signals N1-N2 are removed (or at least significantly attenuated) by the CSF $CSF_3$. The passband 310c of the CSF $CSF_3$ appears at positive frequencies, and may thus be implemented as a complex BP filter. The passband 310c has a center frequency that is closer to 0 Hz than the center frequency of the sub band S3 in the complex input signal (see FIG. 7). Hence, the CM $CM_3$ should perform a negative frequency translation, and the control unit 60 should control the LO signal associated with the CM $CM_1$ such that the phase of the Q component of the LO signal is 90° ahead of the phase of the I component.

FIG. 13d illustrates the output signals from the CM $CM_4$ and the CSF $CSF_4$. FIG. 13d also includes a schematic illustration of the passband 310d of the CSF $CSF_4$. The control unit 60 controls the LO signal associated with the CM $CM_4$ such that the sub band S4, in the output signal from the CM $CM_4$, appears within the passband 310d of the CSF $CSF_4$. In the output signal from the CSF $CSF_4$, only the sub band S4 is present, whereas the other sub bands S1-S3, and the blocking signals N1-N2 are removed (or at least significantly attenuated) by the CSF $CSF_4$. The passband 310d of the CSF $CSF_4$ appears at positive frequencies, and may thus be implemented as a complex BP filter. The passband 310d has a center frequency that is closer to 0 Hz than the center frequency of the sub band S4 in the complex input signal (see FIG. 7). Hence, the CM $CM_4$ should perform a negative frequency translation, and the control unit 60 should control the LO signal associated with the CM $CM_1$ such that the phase of the Q component of the LO signal is 90° ahead of the phase of the I component.

Also for the embodiment illustrated in FIG. 11, the CSFs $CSF_1$-$CSF_N$ may all be fixed filters, i.e. having fixed bandwidths and center frequencies. Alternatively, some or all of the CSFs $CSF_1$-$CSF_N$ may be controllable filters, e.g. having controllable bandwidths and/or center frequencies. The controllable filters may e.g. be controlled from the control unit 60. Thereby, the control unit may adapt the frequency responses of the CSFs $CSF_1$-$CSF_N$ to the frequency bands currently in use.

In the example illustrated in FIGS. 13a-e, the CSFs $CSF_1$-$CSF_4$ of all processing paths are complex bandpass filters. In other embodiments, one of the CSFs may have a passband centered around 0 Hz. Hence, said one of the CSFs can be implemented as in FIG. 8, i.e. comprising a first and a second LP filter 100a and 100b for filtering the I and Q component, respectively, of the output signal of the preceding CM, whereas the other CSFs are implemented as complex BP filters.

As illustrated with the example in FIGS. 13a-e, the processing device 40 may be arranged to process the complex input signal such that the frequency span in the compound complex signal between the lowest and the highest frequency of frequency translated sub bands S1-S4 allocated to the radio receiver 10 is narrower than the corresponding frequency span in the complex input signal between the lowest and the highest frequency of sub bands allocated to the radio receiver 10. This facilitates relaxed bandwidth requirements on circuits (e.g. the ADCs 300) that follow after the adder circuit 260, e.g. compared with if these circuits were to operate directly on a downconverted version of the whole received RF signal (i.e. on the whole total frequency band 4), e.g. as in the reference example illustrated in FIG. 3b. As in FIG. 13e, the processing device 40 may be adapted to process the complex input signal such that the compound complex signal comprises a continuous, or essentially continuous, frequency band comprising all of the sub bands allocated to the radio receiver 10.

According to some embodiments, the processing device 40 may be comprised in a radio-receiver circuit (not shown). The radio receiver circuit may e.g. be comprised in the radio receiver 10.

An aspect that may need to be taken into account when implementing the processing device 40 is the strength and/or the shape of the LO signals driving the CMs $CM_1$-$CM_N$. Consider e.g. the example illustrated in FIGS. 7 and 9a-d. In the output signal of a particular CM illustrated in FIGS. 9a-d, only the associated sub band appears centered around 0 Hz. In an actual physical implementation of the processing device 40, also a residual of signal content appearing at the mirror frequency of the associated sub band in the complex input signal of the processing device may be frequency translated to appear centered around 0 Hz in the output signal of the particular CM due to nonideal suppression of image signals in the particular CM. This residual will interfere with the frequency-translated associated sub band. Furthermore, due to nonlinearities, signal content in the complex input signal of the processing device 40 appearing at harmonics of the LO frequency may also to some extent be frequency translated to appear around 0 Hz and interfere with the frequency-translated associated sub band. In order to obtain a relatively high image suppression in the CM, the CM should be driven as a switching mixer. This could e.g. be obtained by using an LO signal with a square-wave shape or an approximate square-wave shape, or with a sinusoidal LO signal having a relatively high amplitude. On the other hand, in order to obtain a relatively low amount of interference from signal content appearing at harmonics of the LO frequency, the CM should be driven more like a multiplying mixer, ideally performing multiplication with a pure sinusoid. This may e.g. be obtained with an LO signal having a sinusoidal shape and a lower amplitude than if the CM were to be driven as a switching mixer with a sinusoidal LO signal. In view of the above, a trade-off may have to be made to determine an appropriate LO amplitude and/or shape. This trade-off may e.g. be made from implementation to implementation and may e.g. be based on circuit simulations and/or measurements.

For embodiments described above, it has been stated that the mutual phase difference between the I and the Q components of the LO signals is 90°. Due to e.g. manufacturing inaccuracies, noise, and jitter, the mutual phase difference may deviate somewhat from 90° in an actual physical implementation of the processing device 40. Hence, a 90° mutual phase difference, when used in this specification, should not be interpreted strictly as exactly 90°, but rather as approximately or essentially 90°.

In the examples of FIGS. 9a-d and 13a-e, only sub bands allocated to the radio receiver 10 are passed through the processing device 40. In some situations, e.g. if the CSFs $CSF_1$-$CSF_N$ have fixed bandwidths and one or more of the sub bands S1-S4 occupy a bandwidth that is narrower than the fixed bandwidth of the CSF $CSF_1$-$CSF_N$ of the associated processing path $P_1$-$P_N$, signal content from adjacent frequency bands may, to some extent, be allowed to pass through the processing device 40 as well. Even though not all frequency bands that are not allocated to the radio receiver 10 are fully suppressed by the processing device 40 in such a situation, the processing device 40 nevertheless provides a relaxation of dynamic range and bandwidth requirements, e.g. compared with the reference example illustrated in FIG. 3b.

Figure 14:
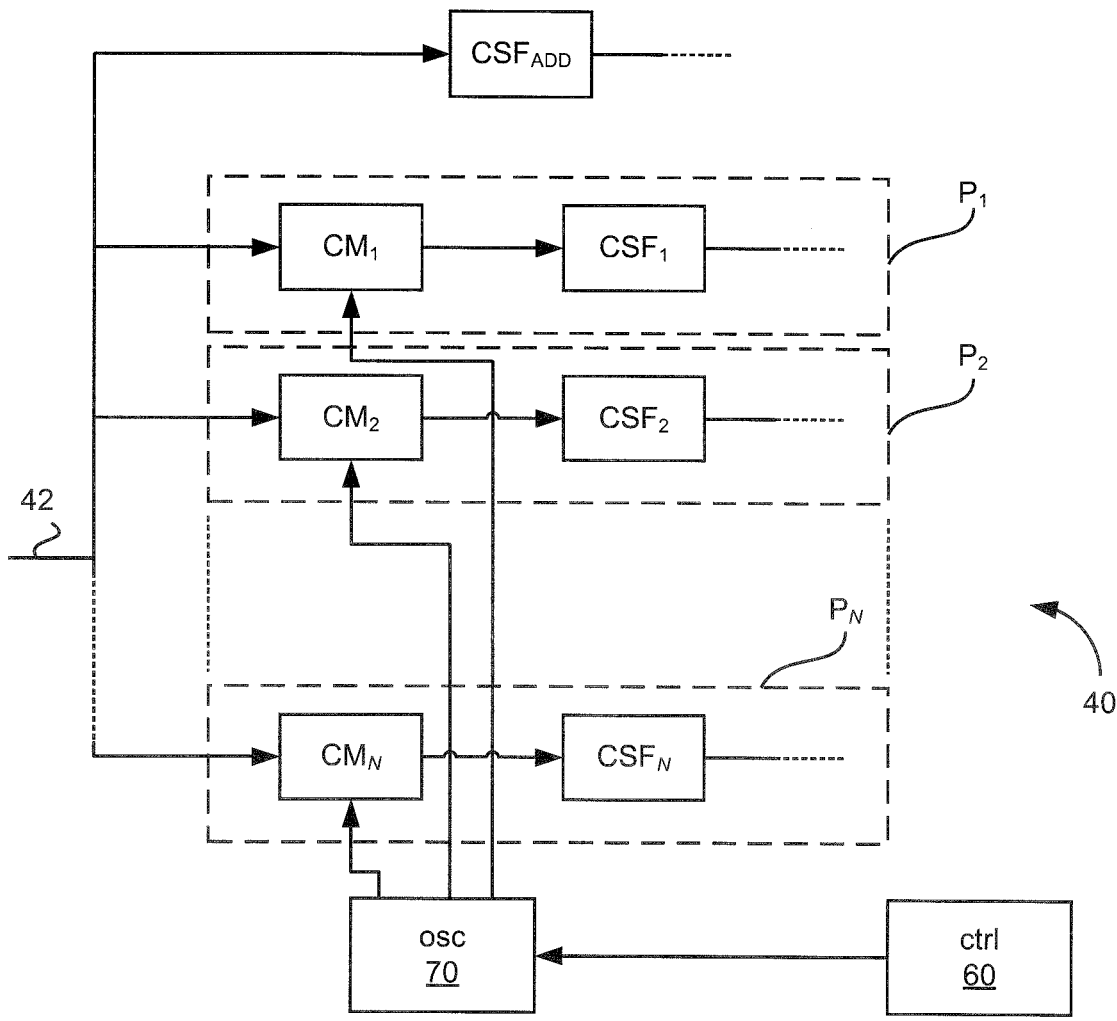
FIG. 14 is a block diagram of a processing device according to an embodiment of the present invention.

FIG. 14 is a block diagram of an embodiment of the processing device 40. Elements that are the same as in the embodiment illustrated in FIG. 5 are denoted with the same reference signs in FIG. 14 as in FIG. 5, and are not further described in the context of FIG. 14. In addition, the embodiment of the processing device 40 illustrated in FIG. 14 comprises an additional CSF $CSF_{ADD}$. The CSF $CSF_{ADD}$ is arranged to receive the complex input signal of the processing device 40 for filtering the complex input signal of the processing device 40. The additional CSF $CSF_{ADD}$ may be considered as a simplified version, without a CM, of a processing path $P_1$-$P_N$. The additional CSF $CSF_{ADD}$ may be used to process a sub band that already appears within a passband of the additional CSF $CSF_{ADD}$ in the complex input signal of the processing device 40, whereby no additional frequency translation of that sub band in a CM is needed.

Figure 15:
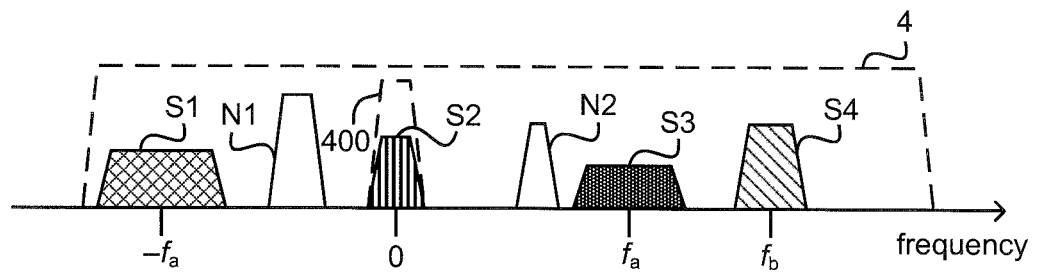
FIG. 15 schematically illustrates a downconverted aggregated signal spectrum according to an example.

FIG. 15 illustrates the spectrum of a downconverted version of the aggregated spectrum RF signal shown in FIG. 2 output from the downconversion unit 20, for an example wherein the embodiment illustrated in FIG. 14 may be suitably employed. The same reference signs are used for the (downconverted) sub bands S1-S4, blocking signals N1-N2, and the total frequency band 4 as for the corresponding RF frequency bands in FIG. 2. In the example, the frequency of the RF LO signal in the downconversion unit 20 has been selected essentially in the center of the RF frequency sub band S2, such that downconverted sub band S2 in the complex input signal to the processing device 40 is essentially centered around 0 Hz. Furthermore, FIG. 15 also includes a schematic illustration of the passband 400 of the additional CSF $CSF_{ADD}$. For this example, the additional CSF $CSF_{ADD}$ may be implemented as in FIG. 8. Hence, the additional CSF $CSF_{ADD}$ may comprise a first LP filter, such as the LP filter 100a in FIG. 8, for passing an I component of the a sub band S2 and a second LP filter, such as the LP filter 100b in FIG. 8, for passing a Q component of the sub band S2. In such a case, the CSF $CSF_{ADD}$, together with the downconversion unit 20 (FIG. 4), operates as a homodyne receiver for receiving the sub band S2.

In other embodiments, the additional CSF may be implemented as a complex BP filter and thus have a passband center frequency other than 0 Hz. The frequency of the RF LO signal in the downconversion unit 20 may then be suitably selected such that one of the sub bands S1-S4, in the complex input signal of the processing device 40, appears within the passband of the additional CSF $CSF_{ADD}$.

As for the CSFs $CSF_1$-$CSF_N$ of the processing paths $P_1$-$P_N$, the additional CSF $CSF_{ADD}$ may be a fixed filter in some embodiments and a controllable filter in some embodiments.

According to some embodiments, the processing device 40 may comprise ADCs (not shown) for converting filtered I and Q components output from the additional CSF $CSF_{ADD}$ to digital representations. Said digital representations may be output from the processing device 40, e.g. to the DSP unit 50 (FIG. 4). Alternatively, said ADCs may e.g. be inserted in the signal path between the processing device 40 and the DSP unit 50 (FIG. 4), or comprised in an analog interface of the DSP unit 50.

According to some embodiments, the additional CSF $CSF_{ADD}$ and the CSFs $CSF_1$-$CSF_N$ of the processing paths $P_1$-$P_N$ may have essentially nonoverlapping passbands. Then, the complex output signal from the additional CSF $CSF_{ADD}$ and the complex output signals from the CSFs $CSF_1$-$CSF_N$ of the processing paths $P_1$-$P_N$ may be added together to form a compound complex signal, e.g. as described in the context of FIGS. 11 and 13a-e. For example, the additional CSF $CSF_{ADD}$ may be included in the embodiment illustrated in FIG. 11, and its output signal may be input to the adder circuit 260.

Although the additional CSF $CSF_{ADD}$ (FIG. 14) has been described in the foregoing as an additional component, it may well in some embodiments of the present invention be used as a replacement for one of the processing paths $P_1$-$P_N$. Thereby, the number of CMs needed can be reduced, which in turn may result in reduced circuit area and/or reduced power consumption. Another consequence is that the number of LO signals needed for controlling the CMs can be reduced as well, which in turn may result in reduced circuit area, reduced power consumption, and/or reduced interference from LO signals.

Another concept, which may be utilized separately, or may be utilized in combination with having a sub band (S2 in FIG. 15) centered or essentially centered around 0 Hz in the complex input signal to the processing device 40 is illustrated in FIG. 15 as well. The sub bands S1 and S3 are centered around a frequency $-f_a$ and a frequency $f_a$, respectively. In such a situation, the sub band S1 and the sub band S3 can be frequency translated to be centered around 0 Hz by CMs $CM_1$-$CM_N$ in a first and a second processing path $P_1$-$P_N$, respectively. These CMs can be driven by LO signals having the same common frequency $f_a$, but with different phase relationships between their I and Q components.

Therefore, in accordance with an embodiment of the present invention, the CM $CM_1$-$CM_N$ in a first processing path of the plurality of processing paths $P_1$-$P_N$ and the CM $CM_1$-$CM_N$ in a second processing path of the plurality of processing paths $P_1$-$P_N$ are arranged to be driven by LO signals having a common frequency $f_a$, which is suitable for processing a sub band (e.g. S3 in FIG. 15) in the complex input signal centered around $f_a$ and a sub band (e.g. S1 in FIG. 15) in the complex input signal centered around $-f_a$ in the first and second processing path, respectively. The frequency $f_a$ may be a variable frequency. This embodiment may also be employed when the center frequencies of the sub bands to be processed in the first and second processing paths are not exactly symmetrically located around 0 Hz. In such a situation, one or both of these sub bands will not be exactly centered around 0 Hz in the output signals from the associated CMs. If the following CSFs are implemented as in FIG. 8, this means that the bandwidths of the LP filters 100a and b may need to be slightly larger than what would have been the case if the sub bands had been exactly centered around 0 Hz in the output signals from the preceding CMs.

An advantage of this embodiment is that the implementation of the oscillator unit 70 (FIGS. 5, 11, and 14) can be simplified, e.g. in that the same oscillator, DDS unit, or the like may be used in the oscillator unit 70 for generating the LO signals to both CMs. For example, the I and Q LO signal component of one of the CMs may be used as the Q and I LO signal component, respectively, of the other CM. Alternatively, the I or Q LO signal component of one CM may be generated by inverting the I or Q LO signal component, respectively, of the other CM. This can e.g. be utilized to reduce the power consumption and/or circuit area for the oscillator unit 70. Furthermore, a reduced number of different LO signal frequencies may result in reduced interference from LO signal.

Furthermore, the sub band to be processed in the first processing path appears as a mirror image to be rejected in the CM of the second processing path, and vice versa. Since both of the sub bands to be processed in the first and second processing path are sub bands allocated to the radio receiver 10 (FIG. 4), their power levels can be controlled (e.g. by means of a transmission-power control (TPC) scheme) to suitable values such that the requirements on image-rejection in the CMs can be relaxed compared with if the CMs should be capable rejecting an image caused by a blocking signal, the power level of which could be significantly higher.

According to some embodiments, the frequency of the RF LO signal in the downconversion unit 20 is selected as, or approximately as, the average value of the center frequencies of two sub bands in the RF signal, such that the above embodiment, wherein two of the CMs $CM_1$-$CM_N$ are arranged to be driven by LO signals having a common frequency $f_a$, can be efficiently utilized.

According to some embodiments, sub bands are allocated to the radio receiver 20, e.g. by the base station 2 (FIG. 1), in pairs that are symmetrically, or essentially symmetrically, located around an RF frequency $f_{RF}$. The frequency of the RF LO signal in the downconversion unit 20 can be selected as, or close to $f_{RF}$. For example, with reference to FIG. 15, the complex input signal could comprise an additional sub band (not shown) centered, or essentially centered, around $-f_b$, thereby forming such a pair of sub bands together with S4, which is centered around $f_b$. In that case, there would be two such pairs of sub bands; one formed by S1 and S3, and one formed by the additional sub band and S4. However, any number of pairs may exist. Pairs of processing paths $P_1$-$P_N$, wherein the CMs of a pair are arranged to be driven with LO signals having a common frequency, can be utilized for efficiently processing pairs of sub bands; one processing path $P_1$-$P_N$ of a pair of processing paths can be used for processing one sub band of a pair of sub bands, and the other processing path $P_1$-$P_N$ of the pair of processing paths can be used for processing the other sub band of a pair of sub bands. In addition, a sub band centered, or essentially centered, around $f_{RF}$ may be allocated to the radio receiver 20, e.g. for processing in the additional CSF $CSF_{ADD}$ (FIG. 14), as is described above in the context of various embodiments.

The embodiments of the processing device 40 described above are not intended limit the scope of the invention. Various variations and combinations of the embodiments may be made. For example, with reference to FIG. 11, instead of adding output signals from all paths to a single compound signal, only a subset of the output signals from the processing paths $P_1$-$P_N$ may be added in the adder circuit 260 for forming the compound complex signals, whereas some or all of the other paths are arranged e.g. as in FIG. 10. Alternatively or additionally, the processing device 40 may comprise more than one adder circuit for forming more than one compound complex signal by adding output signals from different subsets of the processing paths $P_1$-$P_N$.

Depending on e.g. the current number of sub bands allocated to the radio receiver 10, all of the processing paths $P_1$-$P_N$ may not be needed all the time. Currently unused processing paths $P_1$-$P_N$ may e.g. be disabled or powered off for saving power.

Alternatively, one or more of the processing paths, which are not currently needed for processing frequency sub bands allocated to the radio receiver 10 may be configured in a monitoring mode for monitoring the radio environment. The radio environment may e.g. be monitored for detecting and estimating distortion, e.g. from blocking signals such as the blocking signals N1 and N2 (FIG. 2). Thereby various parameters of the processing paths $P_1$-$P_N$ may be adapted to a current distortion scenario. For example, in the presence of a relatively strong blocking signal in the proximity of a frequency sub band allocated to the radio receiver 10, relatively hard requirements may be set on the processing path that is processing that sub band, e.g. in terms of relatively steep passband edges of the CSF in that processing path. However, in the absence of such a blocking signal, the requirements on said processing path may be relaxed, which in turn may be utilized for saving power. For example, the requirements on steepness of the passband edges of the CSF of the processing path may be relaxed (compared with the requirements in the presence of a blocking signal), which allows for a reduced filter order of the CSF. A reduced filter order may e.g. be accomplished by means of disabling one or more components of the CSF, which in turn may be utilized for saving power.

Therefore, according to some embodiments of the present invention, at least one of the processing paths $P_1$-$P_N$, which in the following is referred to as a monitoring path, is adapted to be configured in a monitoring mode if the monitoring path is not currently configured to process a frequency sub band currently allocated to the radio receiver circuit 10. In the monitoring mode, the monitoring path is configured to process one or more frequency sub bands that are currently not allocated to the radio receiver circuit 10 for estimating distortion.

One, more than one, or all of the processing paths $P_1$-$P_N$ may be such a monitoring path. However, in the following, reference is made to a single such monitoring path.

The monitoring path may e.g. be utilized for monitoring:
power of blocking signals causing desensitization of another processing path $P_1$-$P_N$;
power of blocking signals at frequencies that may cause inter-modulation distortion falling into frequency sub bands allocated to the radio receiver circuit 10,
power of combinations of blocking signals resulting in inter-modulation distortion products falling into frequency sub bands allocated to the radio receiver circuit 10, and
bandwidth of blocking signals according to above examples to further improve estimation of power of distortion products that fall into frequency sub bands allocated to the radio receiver 10.

The control unit 60 may, according to embodiments of the present invention, be adapted to configure at least one setting of at least one of the processing paths $P_1$-$P_N$ based on the output of the monitoring path when the monitoring path is configured in the monitoring mode. For example, the control unit 60 may be adapted to determine, based on distortion estimated from the output of the monitoring path in the monitoring mode, a performance requirement of the at least one processing path $P_1$-$P_N$. Furthermore, the control unit 60 may be adapted to configure the aforementioned at least one setting of the at least one processing path $P_1$-$P_N$ based on the determined performance requirement. The at least one setting may e.g. be configured such that the performance of the at least one processing path $P_1$-$P_N$ is not excessively better than the current performance requirements. Thereby, an excessively high power consumption of the at least one processing path $P_1$-$P_N$ under the current performance requirements may be avoided. The at least one setting may e.g. include, but is not limited to,
a filter order, steepness, and/or Q-value of the analog channel-selection filter $CSF_1$-$CSF_N$ of the at least one processing path $P_1$-$P_N$,
a bias current of the at least one processing path $P_1$-$P_N$ (such as a bias current of at least one component of the at least one processing path $P_1$-$P_N$),
a supply voltage of the at least one processing path $P_1$-$P_N$ (such as a supply voltage of at least one component of the at least one processing path $P_1$-$P_N$),
a parameter of an ADC 200a, 200b of the at least one processing path $P_1$-$P_N$, such as a clock frequency, resolution, and/or noise transfer function (in the case of a noise-shaping ADC) of the ADC 200a, 200b,
phase noise of LO signals,
and/or
parameters such as gain, linearity, noise and/or bandwidth of any component of the at least one processing path $P_1$-$P_N$.

Furthermore, the monitoring path may be utilized for estimating parameters of blocking signals for prediction of activity, in time, of the blocking signal. For example, the blocking signal may be a bursty signal that is sometimes active and sometimes silent, e.g. according to a well-defined pattern, or a stochastic pattern which may be predictable using a statistical model based on said parameters. Such parameters may e.g. be, but is not limited to, a duty cycle of the blocking signal, variance in timing of the blocking signal, or variance in power of the blocking signal. These parameters and/or predictions of activity of the blocking signal based on the parameters, may be forwarded to a transmitter, such as a base station transmitting data to the radio receiver circuit 10. Said transmitter may then utilize that information to avoid reception errors in the radio receiver circuit 10 caused by distortion from the blocking signals, e.g. by discontinuing transmission of, or using a more robust modulation format for, signals in affected frequency sub bands when said blocking signal is predicted to be active above a certain power threshold level.

Hence, in accordance with embodiments of the present invention, the control unit 60 is adapted to estimate at least one such parameter of a blocking signal for prediction of activity, in time, of the blocking signal, based on the output of the monitoring path.

According to some embodiments, the monitoring path may have a variable gain value, which may be adjusted based on whether the monitoring path is configured in the monitoring mode, or configured to process a frequency sub band currently allocated to radio receiver circuit 10. If the monitoring path is configured in the monitoring mode, the performance requirements e.g. in terms of signal-to-noise ratio (SNR) may be considerably lower compared with if the monitoring path is configured to process a frequency sub band currently allocated to the radio receiver circuit 10. This is because, in the monitoring mode, it may not be necessary to demodulate and/or decode any signals in the frequency sub band being monitored, but only to estimate e.g. the power of the signals being transmitted in the frequency sub band being monitored. Therefore, it may be possible to use a considerably lower gain in the monitoring mode than when the monitoring path is configured to process a frequency sub band currently allocated to the radio receiver circuit 10. Furthermore, blocking signals in the frequency sub band being monitored in the monitoring mode may well have considerably higher power than signals transmitted to and intended for the radio receiver circuit 10. Therefore, it may be advantageous to use a considerably lower gain in the monitoring mode than when the monitoring path is configured to process a frequency sub band currently allocated to the radio receiver circuit 10, e.g. in order to avoid, or at least limiting the risk of, saturating circuitry, such as an ADC, operatively connected to the monitoring path. As a nonlimiting example, the gain of the monitoring path may be set in the order of 20-30 dB lower in the monitoring mode compared with when the monitoring path is configured to process a frequency sub band currently allocated to the radio receiver circuit 10.

Accordingly, in some embodiments of the present invention, the control unit 60 is adapted to control a gain value of the monitoring path based on whether the monitoring path is configured in the monitoring mode or configured to process a frequency sub band currently allocated to the radio receiver circuit 10.

Figure 16A:
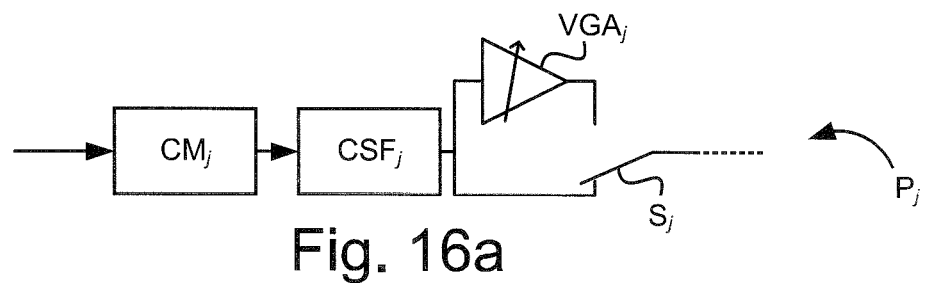
FIGS. 16a and b are block diagrams of processing paths with controllable gain in different configurations according to embodiments of the present invention.

FIGS. 16a and b are block diagrams of an embodiment of a monitoring path $P_j$ with a variable gain value as described above. The processing path $P_j$ comprises a variable-gain amplifier (VGA) $VGA_j$ and a switch $S_j$, which may be used for bypassing the VGA $VGA_j$. The VGA $VGA_j$ may e.g. have a gain which is variable in a range of e.g. 40 dB, but is not limited thereto.

Figure 16B:
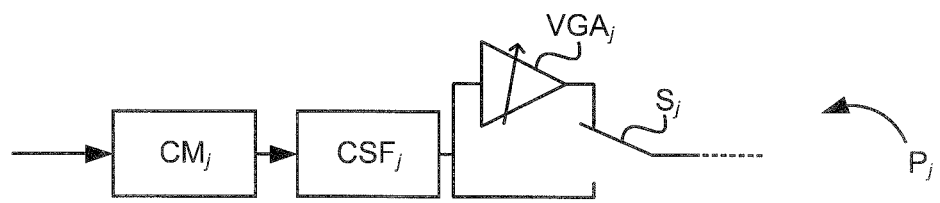

In FIG. 16a, the monitoring path $P_j$ is configured in the monitoring mode, wherein the VGA $VGA_j$ is bypassed by means of the switch $S_j$, whereby the output signal from the CSF $CSF_j$ is forwarded for further processing by the switch $S_j$. In FIG. 16b, the monitoring path $P_j$ is instead configured to process a frequency sub band currently allocated to the radio receiver circuit 10. In that case, the switch $S_j$ is instead set to forward the output signal from the VGA $VGA_j$ for further processing. In this configuration, the control unit 60 may e.g. be adapted to control the gain of the VGA $VGA_j$ for optimum or close to optimum performance, e.g. such that the output signal from the VGA $VGA_j$ has a sufficient power facilitate demodulation and decoding of received data at the same time as saturation of following circuitry is avoided, or at least the risk thereof is kept relatively low. It should be noted that the block diagrams of FIGS. 16a and b are only examples. Monitoring paths with variable gain may be accomplished in other ways as well. For example, additionally or alternatively, in some embodiments, the CSF $CSF_j$ of the monitoring path $P_j$ may have a variable gain.

Another possible use for the monitoring path or paths is in so called cognitive radio applications. In such applications, there can be a number of candidate frequency sub bands that can possibly be used for communication. For example, in most parts of the world, there are unlicensed frequency bands, such as the so called ISM (Industrial, Scientific, and Medical) frequency bands that may be used by anyone. Such unlicensed frequency bands, or sub bands thereof, can in some embodiments be included in the candidate frequency sub bands. Furthermore, some frequency ranges may be licensed for TV broadcasting or other licensed radio transmissions. However, in such frequency ranges, there may, at a given geographical location, temporarily appear unused sub bands, i.e. sub bands that are not used for licensed transmission. Such temporarily unused sub bands are sometimes referred to as spectrum holes or white spaces. These white spaces may be used for transmission in a cognitive radio application. Once a licensed user starts to transmit in such a sub band, the cognitive radio application should stop using the sub band and move to another frequency band. Hence, also licensed frequency bands, or sub bands thereof, can in some embodiments be included in the candidate frequency sub bands.

In cognitive radio applications, the monitoring path can, when configured in the monitoring mode, be used for scanning the candidate frequency sub bands in order to find a suitable one of the candidate frequency sub bands to be used for communication. For example, the monitoring path may monitor the amount of interference present in the candidate frequency sub bands. A candidate frequency sub band may be considered suitable to be used for communication when the amount of interference in the candidate frequency sub band is below a certain threshold level.

According to some embodiments, a method of processing an analog complex input signal generated by downconversion of an aggregated-spectrum RF signal in the radio-receiver 10 is provided. The complex input signal comprises a plurality of sub bands S1-S4 allocated to the radio receiver 10 and scattered across a total frequency band 4. The method may be performed in the processing device 40.

According to embodiments of the method, control data indicating frequency locations of the sub bands S1-S4 is received. For each sub band of the plurality of sub bands S1-S4, the sub band is processed in an associated processing path of a plurality of processing paths $P_2$-$P_N$. An LO signal is provided to a CM $CM_1$-$CM_N$ of the associated processing path $P_1$-$P_N$. In the CM $CM_1$-$CM_N$ of the associated processing path, the complex input signal, and thereby the sub band S1-S4, is frequency translated based on the local oscillator signal provided to the CM $CM_1$-$CM_N$ of the associated processing path. Furthermore, an output signal of the complex mixer $CM_1$-$CM_N$ of the associated processing path $P_1$-$P_N$ is filtered in an analog CSF $CSF_1$-$CSF_N$ of the associated processing path $P_1$-$P_N$. Moreover, the LO signal provided to the CM $CM_1$-$CM_N$ of the associated processing path $P_1$-$P_N$ is controlled based on the frequency location of the sub band S1-S4 and the passband of the CSF $CSF_1$-$CSF_N$ of the associated processing path $P_1$-$P_N$, such that the frequency-translated sub band appears within the passband of the CSF $CSF_1$-$CSF_N$ of the associated processing path $P_1$-$P_N$.

In addition to the plurality of sub bands S1-S4, each being processed in an associated processing path $P_1$-$P_N$ comprising a CM $CM_1$-$CM_N$ and a CSF $CSF_1$-$CSF_N$ according to the above description of embodiments of the method, one or more additional sub bands may be allocated to the radio receiver 10 in some embodiments of the method. These one or more additional sub bands may be processed in a different manner. For example, such an additional sub band may, according to embodiments of the method, be processed in an additional CSF, such as the CSF $CSF_{ADD}$ (FIG. 14), arranged to receive the complex input signal for filtering the complex input signal, e.g. as described above with reference to FIGS. 14 and 15.

Figure 17:
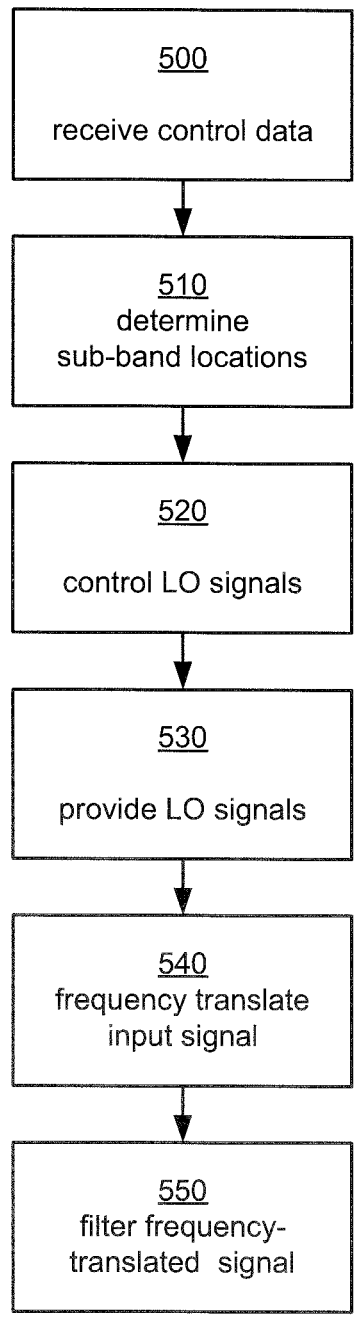
FIG. 17 is a flow chart of a method according to an embodiment of the present invention.

FIG. 17 is a flow chart of an embodiment of the method. In step 500, the control data is received. Furthermore, the frequency locations of the sub bands S1-S4 allocated to the radio receiver 10 are determined based on the control data in step 510. In step 520, the LO signals are controlled, e.g. from the control unit 60, such that appropriate LO frequencies and mutual phase differences (e.g. +90° or −90°) between I and Q components of the LO signals are obtained. Step 520 may e.g. comprise changing one or more LO frequencies and/or one or more signs of mutual phase differences between I and Q components of LO signals in response to updated information regarding sub-band location derived from the received control data. In step 530, the LO signals are provided to the CMs. In step 540, the complex input signal is frequency translated in the CMs. Moreover, the frequency translated signals output from the CMs are filtered by the CSFs in step 550.

It should be noted that although the steps 500-550 are illustrated as being performed in sequence in the flowchart of FIG. 16, some steps may be carried out in parallel. For example, steps 530-550 may represent continuously ongoing processes. Furthermore, variations of the embodiment illustrated in FIG. 16 are possible. For example, additional steps may be performed, such as but not limited to enabling or disabling processing paths, controlling passbands of the CSFs, adding output signals from processing paths for forming a compound signal, and/or converting output signals from the CSFs or the compound signal to digital representation in one or more ADCs, as has been described in the context of embodiments of the processing device 40. Moreover, the method, or parts thereof, may be repeated as necessary. For example, the steps illustrated by the flowchart in FIG. 16 (or variations thereof) may be repeated when new, or updated, control data is available.

The present invention has been described above with reference to specific embodiments. However, other embodiments than the above described are possible within the scope of the invention. Different method steps than those described above, may be provided within the scope of the invention. The different features and steps of the embodiments may be combined in other combinations than those described. The scope of the invention is only limited by the appended patent claims.

The invention claimed is:

1. A processing device for processing an analog complex input signal generated by downconversion of an aggregated-spectrum radio-frequency signal in a radio-receiver, wherein the complex input signal comprises a plurality of sub bands scattered across a total frequency band of the complex input signal, wherein the processing device comprises:
    a plurality of processing paths, wherein each processing path is configured to process an associated sub band and comprises:
        a complex mixer configured to frequency translate the complex input signal, and thereby the associated sub band, based on a local oscillator signal associated with the complex mixer; and
        an analog channel-selection filter operatively connected to an output port of the complex mixer and configured to filter an output signal of the complex mixer and pass the frequency translated associated sub band;
    an oscillator unit configured to provide the local oscillator signal associated with the complex mixer of each processing path; and
    a control unit configured to receive control data indicating frequency locations of the sub bands and, for each processing path, control the local oscillator signal of the complex mixer of that processing path based on the frequency location of the associated sub band and the passband of the analog channel-selection filter of the processing path, such that the frequency-translated associated sub band appears within a passband of the analog channel-selection filter of the processing path.

2. The processing device according to claim 1, comprising an additional channel-selection filter configured to receive the complex input signal of the processing device for filtering that complex input signal.

3. The processing device according to claim 2, wherein the additional channel-selection filter comprises:
    a first low-pass filter for passing an in-phase (I) component of a sub band essentially centered around 0 Hz in the complex input signal of the processing device; and
    a second low-pass filter for passing a quadrature (Q) component of the sub band essentially centered around 0 Hz in the complex input signal of the processing device.

4. The processing device according to claim 1, wherein said complex input signal is a complex baseband signal essentially centered around 0 Hz.

5. The processing device according to claim 1, wherein the channel-selection filter in each processing path comprises:
    a first low-pass filter for filtering an I component of the output signal of the complex mixer of the processing path; and
    a second low-pass filter for filtering a Q component of the output signal of the complex mixer of the processing path.

6. The processing device according to claim 5, wherein the complex mixer in a first processing path of the plurality of processing paths and the complex mixer in a second processing path of the plurality of processing paths are configured to be driven by local-oscillator signals having a common frequency $f_a$ for processing a sub band in the complex input signal essentially centered around $f_a$ and a sub band in the complex input signal essentially centered around $-f_a$, respectively.

7. The processing device according to claim 5, wherein each processing path comprises:
    a first analog-to-digital converter operatively connected to an output terminal of the first low-pass filter of the processing path for converting the filtered I component to a digital representation; and
    a second analog-to-digital converter operatively connected to an output terminal of the second low-pass filter of the processing path for converting the filtered Q component to a digital representation.

8. The processing device according to claim 1, wherein the passbands of the channel-selection filters are essentially non-overlapping and the processing device comprises an adder circuit for adding output signals of the channel-selection filters for forming a compound complex signal.

9. The processing device according to claim 8, wherein the channel-selection filter of one of the processing paths comprises:
    a first low-pass filter for filtering an I component of the output signal of the complex mixer of said one of the processing paths; and a second low-pass filter for filtering a Q component of the output signal of the complex mixer of said one of the processing paths; and wherein the channel-selection filters of the other processing paths are complex bandpass filters.

10. The processing device according to claim 8, wherein the channel-selection filter of each processing path is a complex bandpass filter.

11. The processing device according to claim 8, wherein the processing device is configured to process the complex input signal such that the frequency span in the compound complex signal between the lowest and the highest frequency of the frequency translated sub bands is narrower than the corresponding frequency span in the complex input signal between the lowest and the highest frequency of the sub bands.

12. The processing device according to claim 11, wherein the processing device is configured to process the complex input signal such that the compound complex signal comprises an essentially continuous frequency band comprising all of the frequency translated sub bands.

13. The processing device according to claim 8, wherein the processing device comprises analog-to-digital converters for converting an in-phase (I) and a quadrature (Q) component of the compound complex signal to digital representations.

14. The processing device according to claim 1, wherein the control unit is configured to control the passbands of the channel-selection filters in response to the received control data.

15. The processing device according to claim 1, wherein at least one of the processing paths comprises a monitoring path and is configured to, if the monitoring path is not currently configured to process a frequency sub band currently allocated to the radio receiver circuit, be configured in a monitoring mode to process one or more frequency sub bands not currently allocated to the radio receiver circuit for estimating distortion.

16. The processing device according to claim 15, wherein the control unit is configured to configure at least one setting of at least one of the processing paths based on the output of the monitoring path when the monitoring path is configured in the monitoring mode.

17. The processing device according to claim 16, wherein the control unit is configured to determine, based on distortion estimated from the output of the monitoring path in the monitoring mode, a performance requirement of the at least one processing path and configure said at least one setting of the at least one processing path based on the determined performance requirement.

18. The processing device according to claim 16, wherein the at least one setting includes at least one of:
at least one of a filter order, steepness, and Q-value of the analog channel-selection filter of the at least one processing path;
a bias current of the at least one processing path;
a supply voltage of the at least one processing path;
at least one of a clock frequency, resolution, and noise transfer function of an analog-to-digital converter (ADC) of the at least one processing path;
phase noise of the local oscillator signal provided to the complex mixer of the at least one processing path; and
at least one of gain, linearity, noise and bandwidth of a component of the at least one processing path.

19. The processing device according to claim 16, wherein the control unit is configured to estimate at least one parameter of a blocking signal for prediction of activity, in time, of the blocking signal based on the output of the monitoring path.

20. The processing device according to claim 19, wherein said at least one parameter includes one or more of a duty cycle of the blocking signal, variance in timing of the blocking signal, or variance in power of the blocking signal.

21. The processing device according to claim 16, wherein the control unit is configured to control a gain value of the monitoring path based on whether the monitoring path is configured in the monitoring mode or configured to process a frequency sub band currently allocated to the radio receiver circuit.

22. A radio-receiver circuit comprising a processing device for processing an analog complex input signal generated by downconversion of an aggregated-spectrum radio-frequency signal in the radio-receiver circuit, wherein the complex input signal comprises a plurality of sub bands scattered across a total frequency band of the complex input signal, wherein the processing device comprises:
a plurality of processing paths, wherein each processing path is configured to process an associated sub band and comprises:
a complex mixer configured to frequency translate the complex input signal, and thereby the associated sub band, based on a local oscillator signal associated with the complex mixer; and
an analog channel-selection filter operatively connected to an output port of the complex mixer and configured to filter an output signal of the complex mixer and pass the frequency translated associated sub band;
an oscillator unit configured to provide the local oscillator signal associated with the complex mixer of each processing path; and
a control unit configured to receive control data indicating frequency locations of the sub bands and, for each processing path, control the local oscillator signal of the complex mixer of that processing path based on the frequency location of the associated sub band and the passband of the analog channel-selection filter of the processing path, such that the frequency-translated associated sub band appears within a passband of the analog channel-selection filter of the processing path.

23. An electronic apparatus comprising a processing device for processing an analog complex input signal generated by downconversion of an aggregated-spectrum radio-frequency signal in a radio-receiver, wherein the complex input signal comprises a plurality of sub bands scattered across a total frequency band of the complex input signal, wherein the processing device comprises:
a plurality of processing paths, wherein each processing path is configured to process an associated sub band and comprises:
a complex mixer configured to frequency translate the complex input signal, and thereby the associated sub band, based on a local oscillator signal associated with the complex mixer; and
an analog channel-selection filter operatively connected to an output port of the complex mixer and configured to filter an output signal of the complex mixer and pass the frequency translated associated sub band;
an oscillator unit configured to provide the local oscillator signal associated with the complex mixer of each processing path; and
a control unit configured to receive control data indicating frequency locations of the sub bands and, for each processing path, control the local oscillator signal of the complex mixer of that processing path based on the frequency location of the associated sub band and the passband of the analog channel-selection filter of the processing path, such that the frequency-translated associated sub band appears within a passband of the analog channel-selection filter of the processing path.

24. The electronic apparatus according to claim 23, wherein the electronic apparatus comprises a portable radio communication equipment, a mobile radio terminal, a mobile telephone, a communicator, an electronic organizer, a smartphone, or a computer.

25. A method of processing an analog complex input signal generated by downconversion of an aggregated-spectrum radio-frequency signal in a radio-receiver, wherein the complex input signal comprises a plurality of sub bands scattered across a total frequency band of the complex input signal, and wherein the method comprises receiving control data indicating frequency locations of the sub bands; and for each sub band, processing the sub band in an associated processing path of a plurality of processing paths by:

providing a local oscillator signal associated with a complex mixer of the associated processing path;

frequency translating the complex input signal, and thereby the sub band, in the complex mixer of the associated processing path based on the local oscillator signal associated with the complex mixer;

filtering an output signal of the complex mixer in an analog channel-selection filter of the associated processing path; and controlling the local oscillator signal of the complex mixer of the associated processing path based on the frequency location of the sub band and the passband of the channel-selection filter of the associated processing path, such that the frequency-translated sub band appears within a passband of the channel-selection filter of the associated processing path.

* * * * *

UNITED STATES PATENT AND TRADEMARK OFFICE
CERTIFICATE OF CORRECTION

| | | Page 1 of 1 |
|---|---|---|
| PATENT NO. | : 8,509,725 B2 | |
| APPLICATION NO. | : 13/001758 | |
| DATED | : August 13, 2013 | |
| INVENTOR(S) | : Sundstrom et al. | |

It is certified that error appears in the above-identified patent and that said Letters Patent is hereby corrected as shown below:

On the Title Page, in Item (57), under "ABSTRACT", in Column 2, Line 7, delete "($P_1$-$P_N$). wherein" and insert -- ($P_1$-$P_N$), wherein --, therefor.

On the Title Page, in Item (57), under "ABSTRACT", in Column 2, Line 16, delete "($P_1$-$P_N$). control" and insert -- ($P_1$-$P_N$), control --, therefor.

In the Specification

In Column 1, Line 11, delete "signal" and insert -- signal. --, therefor.

In Column 5, Line 19, delete "systems" and insert -- systems. --, therefor.

In Column 20, Line 28, delete "to," and insert -- to: --, therefor.

In the Claims

In Column 27, Line 17, in Claim 25, delete "comprises" and insert -- comprises: --, therefor.

Signed and Sealed this
Eighth Day of April, 2014

Michelle K. Lee
*Deputy Director of the United States Patent and Trademark Office*